United States Patent
Staples et al.

(10) Patent No.: US 10,725,897 B2
(45) Date of Patent: Jul. 28, 2020

(54) SYSTEMS AND METHODS FOR AUTOMATICALLY PARALLELIZING SEQUENTIAL CODE

(71) Applicant: Securboration, Inc., Melbourne, FL (US)

(72) Inventors: Jacob A. Staples, Hooksett, NH (US); Lee Krause, Indialtantic, FL (US); James B. Schneider, Melbourne, FL (US); Adam K. Kavanaugh, Orlando, FL (US)

(73) Assignee: Securboration, Inc., Melbourne, FL (US)

( * ) Notice: Subject to any disclaimer, the term of this patent is extended or adjusted under 35 U.S.C. 154(b) by 73 days.

(21) Appl. No.: 15/585,516

(22) Filed: May 3, 2017

(65) Prior Publication Data

US 2017/0249235 A1    Aug. 31, 2017

Related U.S. Application Data

(63) Continuation-in-part of application No. 14/048,662, filed on Oct. 8, 2013, now Pat. No. 10,387,293.
(Continued)

(51) Int. Cl.
| | |
|---|---|
| *G06F 11/36* | (2006.01) |
| *G06F 9/455* | (2018.01) |
| *G06F 8/41* | (2018.01) |

(52) U.S. Cl.
CPC .......... *G06F 11/3688* (2013.01); *G06F 8/456* (2013.01); *G06F 9/45516* (2013.01)

(58) Field of Classification Search
CPC ... G06F 11/3688; G06F 8/456; G06F 9/45516
See application file for complete search history.

(56) References Cited

U.S. PATENT DOCUMENTS

| 5,754,860 A | 5/1998 | McKeeman et al. |
|---|---|---|
| 6,223,337 B1 | 4/2001 | Blume |
| (Continued) | | |

FOREIGN PATENT DOCUMENTS

| CA | 2262277 | 5/2003 |
|---|---|---|
| WO | 2010064260 | 6/2010 |

OTHER PUBLICATIONS

PCT International Search Report and Written Opinion in PCT/US2013/063842, dated Mar. 9, 2014, 19 pages.
(Continued)

*Primary Examiner* — Wei Y Zhen
*Assistant Examiner* — Amir Soltanzadeh
(74) *Attorney, Agent, or Firm* — Danielson Legal LLC

(57) ABSTRACT

Systems, methods, and apparatus for automatically parallelizing code segments are provided. For example, an environment includes a profiling agent, a parallelization agent, and a verification agent. The profiling agent executes a code segment and generates a profile of the executed code segment. The parallelization agent analyzes the code segment to determine whether a parallelizable portion is present in the code segment. When a parallelizable portion is present, the parallelization agent determines, based on the profile of the executed code segment, whether to parallelize the parallelizable portion of the code segment. If it is determined to parallelize the parallelizable portion of the code segment, the parallelization agent automatically parallelizes the parallelizable portion of the code segment. The verification agent verifies the functionality and/or correctness of the parallelized code segment.

18 Claims, 13 Drawing Sheets

Related U.S. Application Data

(60) Provisional application No. 61/711,577, filed on Oct. 9, 2012.

(56) References Cited

U.S. PATENT DOCUMENTS

| | | | |
|---|---|---|---|
| 6,243,863 | B1 | 6/2001 | Kothari et al. |
| 7,890,941 | B1* | 2/2011 | Garud ............... G06F 8/443 |
| | | | 712/228 |
| 8,307,337 | B2 | 11/2012 | Chamieh |
| 8,370,316 | B2 | 2/2013 | Bensberg et al. |
| 2002/0013938 | A1* | 1/2002 | Duesterwald ...... G06F 8/4435 |
| | | | 717/160 |
| 2004/0210874 | A1 | 10/2004 | Kageyama et al. |
| 2007/0006168 | A1* | 1/2007 | Dimpsey ........... G06F 11/3466 |
| | | | 717/130 |
| 2008/0046791 | A1* | 2/2008 | Bicheno ........... G06F 11/3688 |
| | | | 714/742 |
| 2008/0134150 | A1 | 6/2008 | Wong |
| 2009/0132999 | A1 | 5/2009 | Reyes |
| 2009/0172353 | A1 | 7/2009 | Su |
| 2010/0223213 | A1 | 9/2010 | Su |
| 2010/0251226 | A1* | 9/2010 | Sato ............... G06F 8/443 |
| | | | 717/146 |
| 2011/0099541 | A1 | 4/2011 | Blomstedt |
| 2011/0239201 | A1 | 9/2011 | Vaidya et al. |
| 2014/0101641 | A1 | 4/2014 | Staples et al. |

OTHER PUBLICATIONS

John Whaley, "Heuristics for Profile-driven Method-level Speculative Parallelization", parallel processing, 2005, ICPP. International Conference on Oslo, Norway, Jun. 14/15, 2005, Piscataway NJ, USA, IEEE, pp. 147-156.r.
U.S. Appl. No. 14/048,662, Office Action dated May 4, 2017, 40 pages.
U.S. Appl. No. 14/048,662, Office Action dated Jul. 5, 2016, 37 pages.
U.S. Appl. No. 14/048,662, Office Action dated Apr. 5, 2016, 40 pages.
U.S. Appl. No. 14/048,662, Office Action dated Oct. 22, 2015, 34 pages.
U.S. Appl. No. 14/048,662, Office Action dated Jun. 4, 2015, 30 pages.
U.S. Appl. No. 14/048,662, Office Action dated Nov. 14, 2014, 24 pages.
U.S. Appl. No. 14/048,662, Amendment and Response filed Jan. 5, 2017, 21 pages.
U.S. Appl. No. 14/048,662, Amendment and Response filed May 24, 2016, 21 pages.
U.S. Appl. No. 14/048,662, Amendment and Response filed Jan. 20, 2016, 21 pages.
U.S. Appl. No. 14/048,662, Amendment and Response filed Sep. 4, 2015, 19 pages.
U.S. Appl. No. 14/048,662, Amendment and Response filed Feb. 11, 2015, 15 pages.
U.S. Appl. No. 14/048,662, Advisory Action dated Jun. 7, 2016, 3 pages.

* cited by examiner

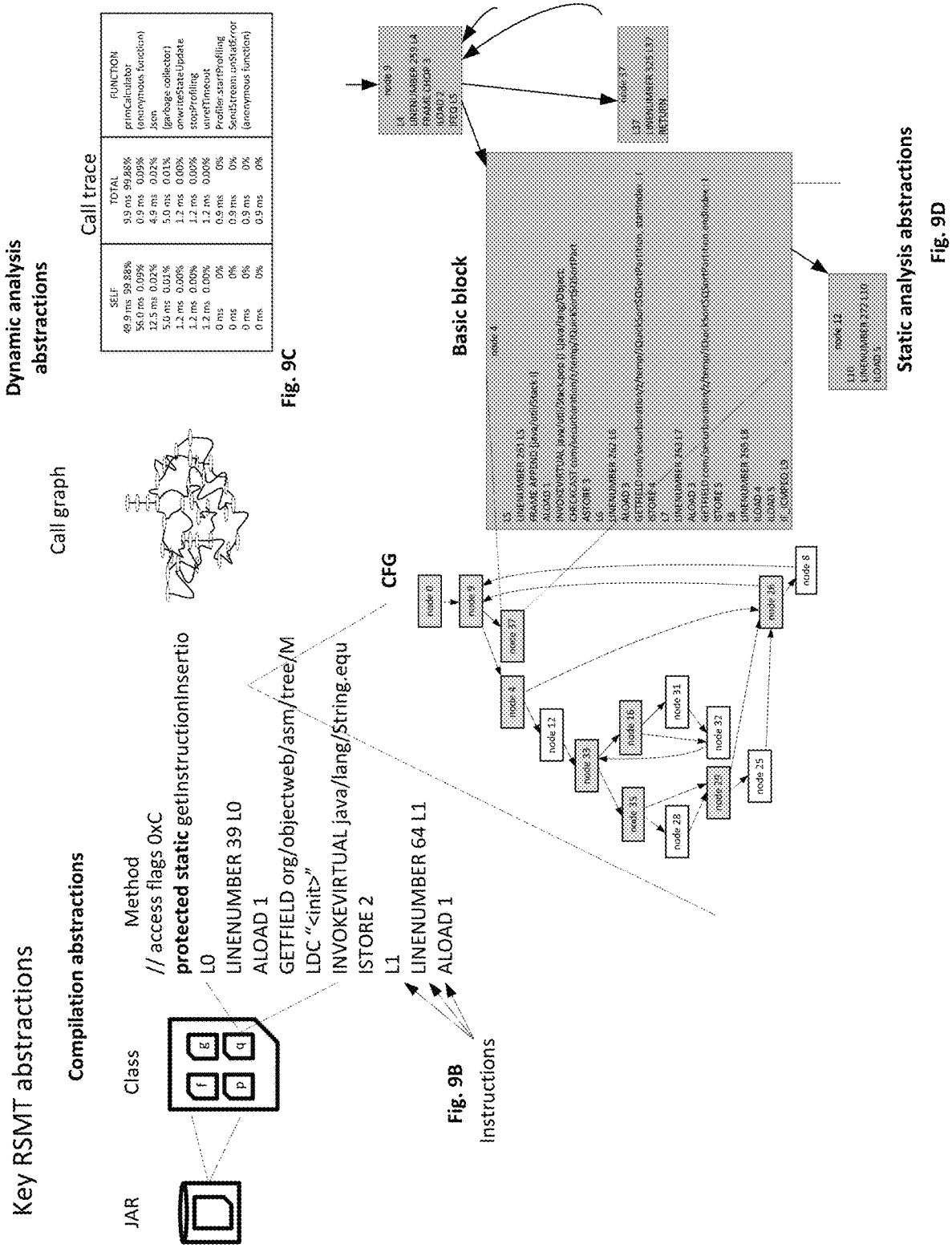

SYSTEMS AND METHODS FOR AUTOMATICALLY PARALLELIZING SEQUENTIAL CODE

CROSS-REFERENCE TO RELATED APPLICATIONS

This application is a continuation-in-part of U.S. patent application Ser. No. 14/048,662, entitled "SYSTEMS AND METHODS FOR AUTOMATICALLY PARALLELIZING SEQUENTIAL CODE," filed Oct. 8, 2013, which claims priority to U.S. Provisional Patent Application No. 61/711,577 entitled "Systems and Methods for Automatically Parallelizing Sequential Code," filed Oct. 9, 2012, which applications are incorporated herein by reference in their entirety.

GOVERNMENT STATEMENT

This technology was made with government support under Contract Number O11B-T03-1010 awarded by the Air Force Research Laboratory. The government may have certain rights in the technology.

BACKGROUND

As processor clock speed has begun to reach its thermal and power constraint limitations, improving processor performance using mechanisms other than increasing the speed of the processor clock is desirable. Accordingly, programmers have turned to thread level parallelism to improve processing performance. However, programming threads in parallel is a tedious and time-consuming task and may be fraught with errors.

Moreover, as the internet of things (IoT) network continues to expand, the potential to exploit cybersecurity vulnerabilities also expands. In many cases, such exploits leverage flaws in trusted services and applications, which often are unable to benefit from existing tools such as antivirus software. As a result, cybersecurity software has trended towards increases in size and complexity, which further results in bloated applications and services comprising dependencies on largely unused code segments and libraries. Unfortunately, these bloated applications and services provide exploiters with additional attack surfaces, thereby mitigating efforts to increase cybersecurity.

It is with respect to these and other general considerations that embodiments have been made. In addition, although relatively specific problems have been discussed, it should be understood that the embodiments should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Examples of the present disclosure describe systems and methods for the automatic parallelization of code segments. In one embodiment, a method may include executing a code segment to generate a profile of the executed code segment and analyzing the code segment to determine whether a parallelizable portion is present in the code segment. When a parallelizable portion is present in the code segment, the method may further include determining, based on the profile of the executed code segment, whether to parallelize the parallelizable portion of the code segment. When the parallelizable portion is present in the code segment, the method may further include automatically parallelizing the parallelizable portion of the code segment based on the profile of the executed code segment. In one embodiment, the code segment may be a binary code segment. In another embodiment, the code segment may be a method in a code base. In another embodiment, the code segment may be a class in a code base. The parallelizable portion of the code segment may include at least one parallel structure. In one embodiment, the analyzing operation may include analyzing a processor time required to execute the code segment.

In one embodiment, a method may include determining, during execution of a first code segment, a first performance characteristic of the first code segment, determining, based on the first performance characteristic, at least one parallelizable portion of the first code segment, and automatically transforming the parallelizable portion of the first code segment into a parallelized code segment. The first performance characteristic may include the processor time for executing the first code segment. In one embodiment, the processor time for executing the first code segment may be based on the number of times the first code segment is executed. In another embodiment, the processor time for executing the first code segment is based on the type of structure of the first code segment. The method may further include determining, during execution of the parallelized code segment, a second performance characteristic of the parallelized code segment, and comparing the first performance characteristic with the second performance characteristic. The second performance characteristic may include the processor time for executing the parallelized code segment. The processor time for executing the parallelized code segment may be based on the number of times the parallelized code segment is executed.

In one embodiment, a method for verifying functionality of a parallelized code segment may include receiving a model of expected behavior of a code segment, automatically generating a first test vector associated with the code segment during execution of the code segment, and automatically generating a second test vector associated with the parallelized code segment during execution of the parallelized code segment. The parallelized code segment may be derived from the code segment. The method may further include comparing the first test vector to the model of expected behavior to obtain a first result, comparing the second test vector to the model of expected behavior to obtain a second result, and comparing the first result and the second result to verify functionality of the parallelized code segment. The model of expected behavior may include observed input/output sets for the code segment. The first test vector may include inputs to the code segment and the code segment return type. The second test vector may include inputs to the parallelized code segment and the parallelized code segment return type. In one embodiment, the method may further include computing an input hash value of the first test vector inputs and an output hash value of the first test vector return type and comparing the input hash value with the model of expected behavior.

In one embodiment, a system may include a processor and a memory. The memory may be for storing instructions which, when executed by the processor, performs a method. The method performed may include executing a code segment to generate a profile of the executed code segment and analyzing the code segment to determine whether a parallelizable portion is present in the code segment. When a parallelizable portion is present in the code segment, the method may further include determining, based on the profile of the executed code segment, whether to parallelize the parallelizable portion of the code segment. When the parallelizable portion is present in the code segment, the method may further include automatically parallelizing the parallelizable portion of the code segment based on the profile of the executed code segment.

In one embodiment, a system may include a processor and a memory. The memory may be for storing instructions which, when executed by the processor, performs a method. The method performed may include determining, during execution of a first code segment, a first performance characteristic of the first code segment, determining, based on the first performance characteristic, at least one parallelizable portion of the first code segment, and automatically transforming the parallelizable portion of the first code segment into a parallelized code segment. The method may further include determining, during execution of the parallelized code segment, a second performance characteristic of the parallelized code segment, and comparing the first performance characteristic with the second performance characteristic.

In one embodiment, a system may include a processor and a memory. The memory may be for storing instructions which, when executed by the processor, performs a method. The method performed may include receiving a model of expected behavior of a code segment, automatically generating a first test vector associated with the code segment during execution of the code segment, and automatically generating a second test vector associated with the parallelized code segment during execution of the parallelized code segment. The parallelized code segment may be derived from the code segment. The method may further include comparing the first test vector to the model of expected behavior to obtain a first result, comparing the second test vector to the model of expected behavior to obtain a second result, and comparing the first result and the second result to verify functionality of the parallelized code segment.

In one embodiment, a method may include analyzing a code segment to determine whether the code segment includes a parallelizable portion. The analyzing operation may be performed at compile time. When it is determined that the code segment includes the parallelizable portion, the method may further include adding at least one transactional marker to the parallelizable portion of the code segment. The method may further include automatically transforming the parallelizable portion of the code segment into a parallel structure.

In one embodiment, a method may include determining, during execution of a first code segment, a first performance characteristic of the first code segment and automatically transforming the parallelizable portion of the first code segment into a parallelized code segment. The method may further include determining, during execution of the parallelized code segment, a second performance characteristic of the parallelized code segment and comparing the first performance characteristic with the second performance characteristic.

In one embodiment, a method may include receiving a model of expected behavior of a code segment, receiving a first test vector associated with the code segment, and automatically generating a second test vector associated with a parallelized code segment during execution of the parallelized code segment. The parallelized code segment may be derived from the code segment. The method may further include comparing the first test vector to the model of expected behavior to obtain a first result, comparing the second test vector to the model of expected behavior to obtain a second result, and comparing the first result and the second result to verify functionality of the parallelized code segment.

In one embodiment, a system may include a processor and a memory. The memory may be for storing instructions which, when executed by the processor, performs a method. The method performed may include analyzing a code segment to determine whether the code segment includes a parallelizable portion. The analyzing operation may be performed at compile time. When it is determined that the code segment includes the parallelizable portion, the method may further include adding at least one transactional marker to the parallelizable portion of the code segment. The method may further include automatically transforming the parallelizable portion of the code segment into a parallel structure.

In one embodiment, a system may include a processor and a memory. The memory may be for storing instructions which, when executed by the processor, performs a method. The method performed may include determining, during execution of a first code segment, a first performance characteristic of the first code segment and automatically transforming the parallelizable portion of the first code segment into a parallelized code segment. The method may further include determining, during execution of the parallelized code segment, a second performance characteristic of the parallelized code segment and comparing the first performance characteristic with the second performance characteristic.

In one embodiment, a system may include a processor and a memory. The memory may be for storing instructions which, when executed by the processor, performs a method. The method performed may include receiving a model of expected behavior of a code segment, receiving a first test vector associated with the code segment, and automatically generating a second test vector associated with a parallelized code segment during execution of the parallelized code segment. The parallelized code segment may be derived from the code segment. The method may further include comparing the first test vector to the model of expected behavior to obtain a first result, comparing the second test vector to the model of expected behavior to obtain a second result, and comparing the first result and the second result to verify functionality of the parallelized code segment.

Examples of the present disclosure further describe systems and methods relating to a robust software modeling tool (RSMT). In aspects, one or more code segments may be received by or accessible to the RSMT. The RSMT may evaluate and/or perform testing on the code segments(s) to determine locations to associate behavioral tracing instructions. After associating the behavioral tracing instructions, additional evaluation and testing may be performed on the code segments(s). The additional evaluation and testing may cause one or more logs comprising behavior events to be generated. The RSMT may analyze the logs to determine unused, vulnerable and/or unoptimized regions of the code segments. The determined regions may then be removed from, suppressed or optimized in the one or more code segments. In examples, the removal/suppression of the unused and/or vulnerable regions may result in compressing/minimizing the size of the code segment; thereby, reducing the attach surface of the code segments. The optimization of the unoptimized regions may result in: the parallelization of the code segments; the ability to execute the code segments on existing software (such that new software constructs and/or programming abstractions are not required in order to benefit from the optimization); the ability to use computing resources that have become available after the code segments have been executed without needing to restart or re-execute the code segments, etc.

These and other features and advantages, which character the present non-limiting embodiments, will be apparent from a reading of the following detailed description and a review of the associated drawings. It is to be understood that both the foregoing general description and the following detailed description are explanatory only and are not restrictive of the non-limiting embodiments as claimed.

BRIEF DESCRIPTION OF THE DRAWINGS

Non-limiting and non-exhaustive embodiments are described with reference to the following Figures in which:

FIGS. 9B-D illustrate examples of code abstractions generated according to an embodiment of the present disclosure.

DETAILED DESCRIPTION

Figure 1:
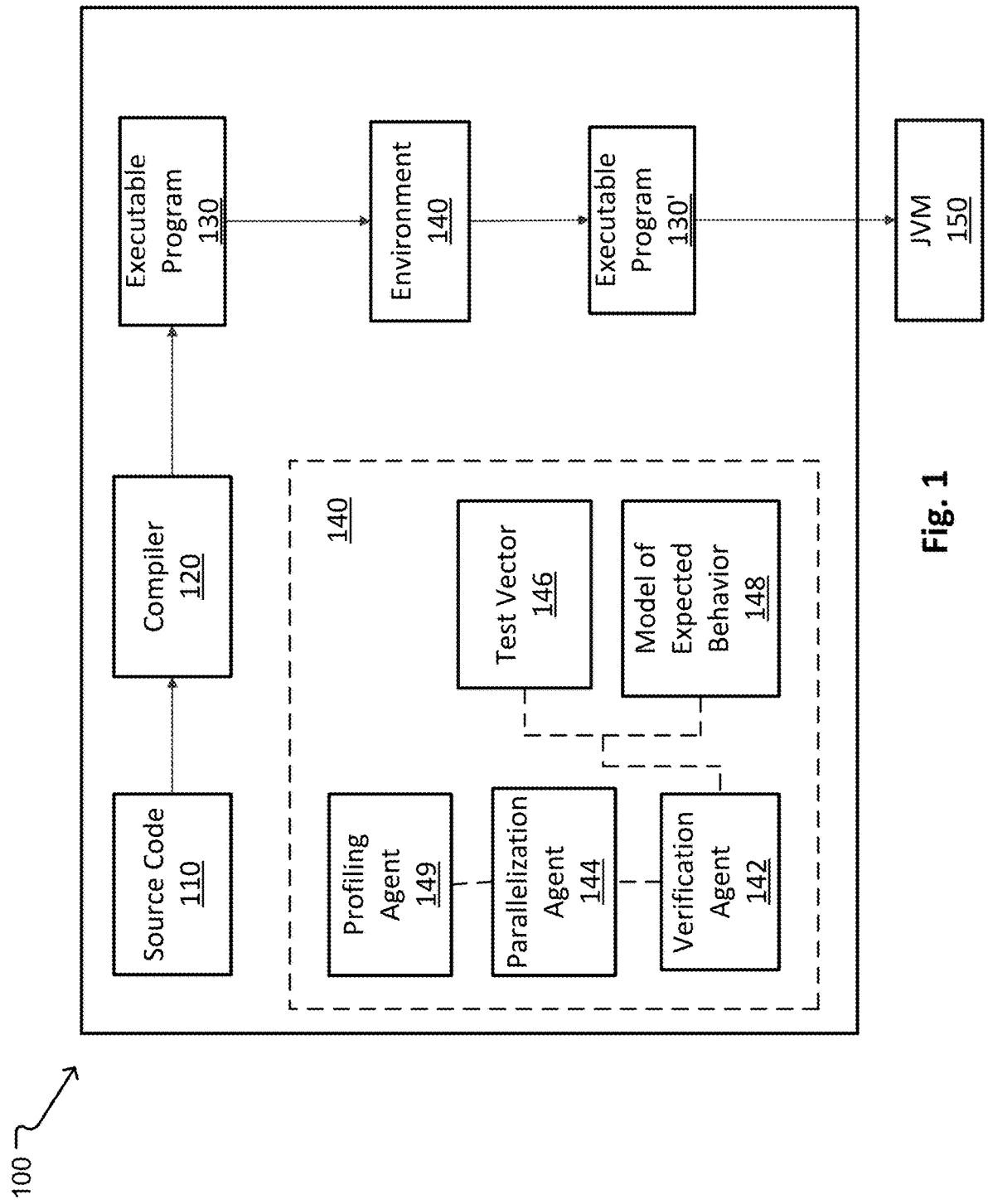
FIG. 1 is a block diagram illustrating an operating environment for automatically parallelizing a code segment according to an embodiment of the present disclosure.

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The present disclosure relates in part to automatic parallelization of code segments. Existing techniques for automatic parallelization of certain code are typically not entirely automated, require access to the original source code that is to be parallelized, and/or use traditional locking techniques requiring a precise vectorization to be constructed at compile time. Accordingly, embodiments described herein include a system for automatic parallelization of code segments. In turn, the performance of software, executable code, and/or binary executable is optimized and the correctness of the automatic parallelization is ensured and/or verified (e.g., verifying that the original binary code functionality has not been broken).

The present disclosure also relates in part to a robust software modeling tool (RSMT) for minimizing the attack surface of code segments. In aspects, one or more code segments may be received or accessible to the RSMT. The RSMT may evaluate and/or perform testing (e.g., unit tests, integration test, validation test, etc.) on the code segments(s) to, for example, determine locations in the code segments to associate behavioral tracing instructions. After associating the behavioral tracing instructions, additional evaluation and testing may be performed on the code segments(s). The additional evaluation and testing may cause one or more logs comprising behavior events to be generated. The RSMT may analyze the logs to determine unused, vulnerable and/or unoptimized regions of the code segments, and/or to determine a model of expected or correct behavior for the code segments. The determined regions may then be removed from, suppressed or optimized in the one or more code segments. Additionally, the determined regions may be used to provide notifications when the code segment performs unexpectedly, loads a library with a known vulnerability, or the like. In examples, the removal/suppression of the unused and/or vulnerable regions may result in compressing/minimizing the size of the code segment; thereby, reducing the attach surface of the code segments. The optimization of the unoptimized regions may result in: the parallelization of the code segments; the ability to execute the code segments on existing software (such that new software constructs and/or programming abstractions are not required in order to benefit from the optimization); the ability to use computing resources that have become available after the code segments have been executed without needing to restart or re-execute the code segments, etc.

FIG. 1 illustrates an operating environment 100 for automatically parallelizing code according to one or more embodiments. In embodiments, the operating environment 100 may be a static operating environment. As shown in FIG. 1, the operating environment 100 may include source code 110, a compiler 120, an executable program 130, an environment 140, an executable program 130', and a Java virtual machine (JVM) 150. The environment 140 may include a verification agent 142, a parallelization agent 144, and a profiling agent 149. In some embodiments, the verification agent 142 may utilize and/or include at least one test vector 146 and at least one model of expected behavior 148. The operating environment 100 may include a configuration in which one or more of the present embodiments may be implemented during compilation of the source code 110 or after compilation of the source code 110 and before the executable program 130 is executed (e.g., before the runtime of the executable program 130).

In one embodiment, the source code 110 may be high-level source code written in a programming language that is targeted by the JVM 150, such as Java, JRuby, Jython, and Groovy, for example. In some embodiments, the source code 110 may be any high-level programming language such as Java Script, C, C++, Python, etc. The source code 110 may include at least one or more classes, functions, methods, objects, threads, loops, etc. and may be written in a sequential manner (e.g., each instruction is executed one after the other). The compiler 120 includes at least one computer program for transforming the source code 110 into another computer language such as byte code and/or object code to create an executable program (e.g., executable program 130). As such, the compiler 120 may receive source code 110 and include instructions for transforming the source code 110 into the executable program 130. Before the executable program 130 is sent to the JVM 150 to be executed, the executable program 130 may be processed by the environment 140.

As mentioned above, the environment 140 may include various components for processing the executable program 130. A first component may include the profiling agent 149. The profiling agent 149 may be configured to instrument the code of the executable program 130 ("code") to facilitate hot spot analysis. For example, the profiling agent 149 analyzes executions of a code segment to track how long methods take to execute. A code segment may include sequential code, such as, for example, code including instructions that are executed one after the other. Additionally, the profiling agent 149 may be configured to identify portions of code which would benefit most from parallelization. As such, the profiling agent 149 may determine which methods in a code segment are taking the most processor time during execution. In other examples, the profiling agent 149 may be configured to determine which classes (e.g., the classes in which the methods are found) are taking the most processor time and which threads (e.g., the threads in which the methods are found) are taking the most processor time. In this regard, the profiling agent 149 may produce an execution profile. The execution profile may include statistics regarding processor times during execution of methods, classes, and/or threads, for example.

In certain embodiments, the environment 140 may include a parallelization agent 144. The parallelization agent 144 may be configured to analyze a code segment such that parallelizable structures are identified. Additionally, the parallelization agent 144 may be configured to transform the portions of the code segment that are found to be parallelizable into parallelized code. As such, the parallelization agent 144 may receive the set of executable programs 130 and/or the execution profile from the profiling agent 149. In the analysis state, the parallelization agent 144 generally analyzes a read-modify-write sequence of instructions for a local variable of a portion of the code (e.g., sequential loop iterations such as for( ) while( ) and do while( ) loops) and determines whether the sequence contains a modification operation that is reducible. In embodiments, a reducible operation is an operation which is fully commutative, i.e., the order of operand placement does not affect the result of the operation. If the modification operation is reducible, the sequence/segment of code contains a parallelizable structure.

When a code segment is determined to be parallelizable, one or more embodiments provide that the parallelization agent 144 determines whether it is beneficial to parallelize the parallelizable portion of the code segment. For example, the parallelization agent 144 may analyze the execution profile and compare it against the parallelizable portion of the code segment (or code segments) to determine whether it is beneficial to parallelize the parallelizable portion of the code segment. For example, a code segment found to be parallelizable would subsequently be parallelized if the gain in processing time is above a predetermined threshold. In certain embodiments, the predetermined threshold may be based on the type of structure that is parallelizable. In another embodiment, the predetermined threshold may be based on the number of times the code segment is called during execution of the program.

If it is determined that it is beneficial to parallelize the parallelizable portion of the code segment, the parallelizable portion of the code segments may be transformed. In the transformation state, the parallelization agent 144 may produce a transformed code segment (e.g., a method) which is able to run on one or more threads concurrently. This process may include modifying the original executable program 130 containing the method/code segment to be parallelized/transformed and creating a new parallelized executable program 130'. The new parallelized executable program 130' will have the same functionality of the original method's sequential loop iterations while running more efficiently.

In certain embodiments, the verification agent 142 may include optimization and verification functionality. An optimization component (not shown) is configured to determine whether the parallelized code is partitioned near-optimally for the underlying hardware architecture. For example, the optimization component may receive a set of the parallelized executable programs 130' and the execution profile produced by the profiling agent 149. The optimization component may generate a set of re-instrumented executable programs derived from the set of the parallelized executable programs 130' and the execution profile. The re-instrumented executable programs may be partitioned such that the work distribution between a number of threads is near optimal for the underlying hardware architecture.

A verification component (not shown) may verify that the parallel transformation did not introduce any errors into the original code. For example, the verification component may receive a set of near optimally parallelized executable programs produced by the optimization component, a set of test vectors 146 and a model of expected behavior 148. The test vectors 146 and the model of expected behavior 148 may be provided by a programmer, administrator or other user. The test vectors 146 may include inputs to the method being verified ("test vector inputs") and the method return type ("test vector output"). The model of expected behavior 148 may include all observed input/output sets for the method being verified during its execution over a number of invocations. In certain embodiments, the number of invocations may be predetermined by the programmer, administrator etc. In another embodiment, the number of invocations may be determined by the system, the type of code segment that was parallelized, or the number of time the parallelized code segment is executed. As such, the verification component may compute an input hash value of the test vector inputs and an output hash value of the test vector output and then invoke a verification method whose arguments are the input hash value and the output hash value.

In certain embodiments, the verification method may compare an input hash value with the model of expected behavior 148 to find a match between the input hash value and the observed input sets of the model of expected behavior 148. If no match is found (e.g., the test vector inputs have never been executed by the method), a new observed input/output set of the model of expected behavior 148 may be created for this input/output hash pair. If a match is found, the verification method may compare the output hash with the model of expected behavior 148 to verify the output hash matches the observed output from the model of expected behavior 148. If the output hash matches the observed output from the model of expected behavior 148, verification succeeds. If the output hash does not match the observed output from the model of expected behavior 148, verification fails. If verification succeeds, the parallelized executable programs 130' may be assumed to be correctly transformed. If a verification failure occurs during execution, the parallelized executable programs 130' may be assumed to be incorrectly transformed.

In another embodiment, the environment 140 may be executed during compilation of the source code 110. For example, during compilation, the environment 140 may transform sequential loop iterations into parallel loop iterations, as described above with reference to the environment 140 processing at least one executable program 130.

The operating environment 100 may include some form of a central processing unit (CPU) (e.g., one or more processors disposed in any appropriate processing architecture). For example, the environment 140 may include instructions of a computer program, for example, for performing arithmetical, logical, and/or input/output operations of the operating environment 100. For example, when the executable program 130 is received by the environment 140 after the source code 110 is received by the compiler 120 and compiled into the executable program 130, the various components of the environment 140 may include instructions to process the executable program 130 such that it is determined whether the executable program 130 is parallelizable, whether it is beneficial to parallelize the parallelizable portion of the executable program 130, instructions for parallelizing the parallelizable portion of the executable program 130, and instructions for verifying the correctness of parallelizing the parallelizable portion of the executable program 130.

Figure 2:
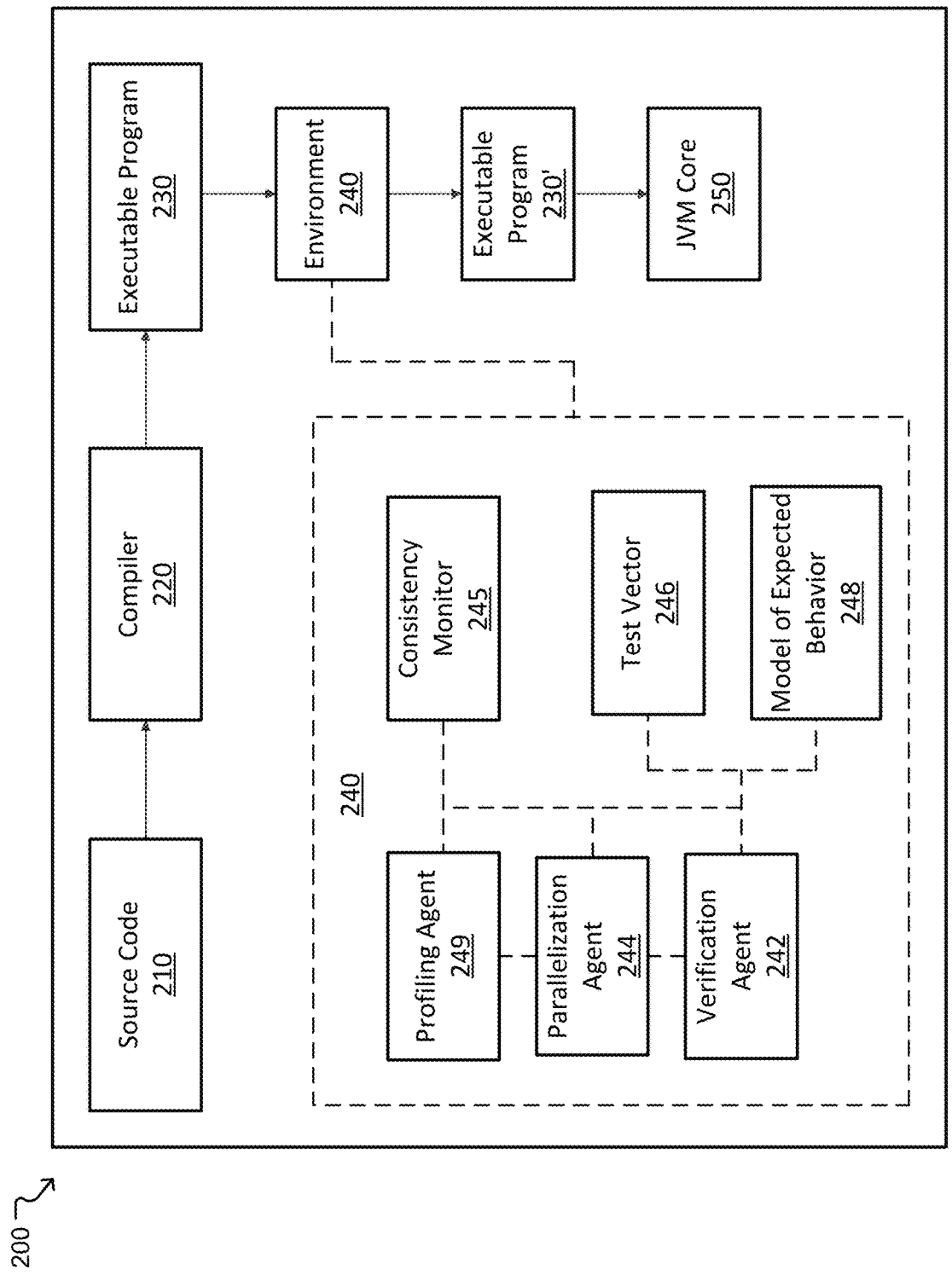
FIG. 2 is a block diagram illustrating an operating environment for automatically parallelizing a code segment according to an alternate embodiment of the present disclosure.

FIG. 2 illustrates an operating environment 200 for automatically parallelizing code according to one or more embodiments. In embodiments, the operating environment 200 may be a dynamic operating environment. The operating environment 200 may be implemented via a JVM (e.g., such as the JVM 150 described above relative to FIG. 1). As shown in FIG. 2, the operating environment 200 may include source code 210, a compiler 220, an executable program 230, an environment 240, an executable program 230, and a JVM core 250. The environment 240 may include a verification agent 242, a parallelization agent 244, and a profiling agent 249. In some embodiments, the verification agent 242 may utilize and/or include at least once test vector 246 and at least one model of expected behavior 248. The operating environment 200 may include a configuration in which one or more of the present embodiments may be implemented during execution/runtime of the executable program 230. In one example, a configuration may include the capability of implementing operating environment 200 via the JVM such that operating environment 200 may be turned on and off, for example, based on resource needs. The source code 210, compiler 220, executable program 230, environment 240, and executable program 230 may be configured similar to the source code 110, a compiler 120, an executable program 130, environment 140, and executable program 130' described above relative to FIG. 1. In this regard, the operating environment 200 may include all the functionality described in the above embodiments relative to the operating environment 100 of FIG. 1.

As such, in the operating environment 200, while the executable program 230 is executed, the environment 240 may determine whether the executable program 230 is parallelizable and whether it is beneficial to parallelize the parallelizable portion of the executable program 230. If it is determined to be beneficial to parallelize the parallelizable portion of the executable program 230, the environment 240 may parallelize the parallelizable portion of the executable program 230 and verify the correctness of parallelized portion of the executable program 230.

For example, similar to the parallelization agent 144 described above with reference to the static operating environment 100 of FIG. 1, the parallelization agent 244 may be configured to analyze the code such that parallelizable structures are identified and to transform the portions of the code found to be parallelizable into parallel code. In this regard, the parallelization agent 244 may process the executable program 230, as it is executed, first by identifying one or more sequential loop iterations in one or more methods of the executable program 230. After one or more sequential loop iterations are identified, a pre-transformation stage may be performed on instructions of the loop iterations that obscure data dependencies. An instruction that may obscure data dependencies may include an instruction that increments a local variable by a fixed amount. In this regard, the pre-transformation stage may include converting those instructions that obscure data dependencies into a primitive read, modify, write instruction sequence such that when dependency analysis is performed, it is easier to identify that a local variable is being read and subsequently written.

After the pre-transformation stage is performed, a loop pre-analysis stage may be performed. The loop pre-analysis stage may determine whether assumptions about the nature of the identified sequential loop iterations hold. For example, one assumption may include that a loop iteration condition test is dependent upon a single numeric value that gets updated once at the end of the loop. Another assumption may include that the loop index initial and limit values are known just before the loop begins and that neither of these values nor the loop index are modified in the loop body. As such, the sequential loop iterations may be analyzed by the parallelization agent 244 using such assumptions.

Another stage of the analysis performed by the parallelization agent 244 may include a dependency analysis stage. The dependency analysis stage may determine the mapping of individual instructions to other instructions. This may include determining which instructions correspond to reads and writes to one or more variables, either local variables or global variables. As such, an atomic guard analysis may be created. The atomic guard analysis may include leaving local variables declared inside the loop alone (e.g., each thread may create an independent copy), converting local variables declared outside the loop and which are read only to fields accessible by each thread executing loop iterations, and converting local variables declared outside the loop which are subsequently written inside the loop to fields accessible by each thread executing loop iterations.

After performing dependency analysis, a loop post analysis stage may be performed to determine whether the loop is parallelizable or inherently sequential. For example, a read-modify-write sequence of instructions for a local variable may be analyzed. As an example, in the statement x=x+i, there are two read-modify-write chains. The first includes a read to x, the mathematical operator+, and a write to i. The second may include a read to i, to mathematical operator+, and a write to x. Next, the terminal node of these read-modify-write chains may be analyzed. If the terminal node is a local variable declared outside the loop which is subsequently written inside the loop (as discussed above), the chains terminating in that variable may be analyzed to determine whether each is reducible. If any such chain contains a modification operation that is not reducible, it is determined that the loop is not parallelizable. As discussed above, a reducible operation is one which is fully commutative. Some examples of reducible operations may include addition, multiplication, binary and logical OR, binary and logical XOR, and binary and logical AND.

A final check may be performed after it is determined that a portion of the code can be parallelized. One check may include determining if the method contains any dependency-obscuring instruction after the loop pre-transformation stage. If the method does contain any dependency-obscuring instruction after the pre-transformation stage, then it is determined that something may have failed during analysis and a breaker may be thrown. Additionally, before the parallizable portions of the code are transformed, a preliminary class loader verification test may be performed to ensure that the initial transformations performed do not prevent the code from being successfully loaded by a Java classloader.

As discussed above, the parallelization agent 244 may be configured to transform the portions of the code found to be parallelizable into parallel code. Before the portions of the code found to be parallelizable are transformed into parallel code and after it is determined that the code is parallelizable, it is determined whether it is beneficial to transform/parallelize the parallelizable code. As discussed above, the parallelization agent 244 may receive an execution profile from the profiling agent 249, analyze the execution profile and compare it against the parallelizable portion of the code segment (or code segments) to determine whether it is beneficial to parallelize the parallelizable portion of the code segment. If it is determined that it is beneficial to parallelize the parallelizable portion of the code segment, the parallelization agent 244 may proceed with transforming the parallelizable portion of the code segment. In one embodiment, it may be determined that it is beneficial to parallelize the parallelizable portion of the code segment if the code segment is called a minimum number of times during execution of the program. In other embodiments, it may be determined that it is beneficial to parallelize the parallelizable portion of the code segment if the processor speed/resources meet a predetermined threshold (e.g., if the gain in processing time is above a predetermined threshold).

As discussed above, transforming the parallelizable code may include modifying the original class containing the method to be parallelized and creating a new parallelized class which implements a runnable interface. This interface may include the new functionality of the original method's loop(s) in its run method. Modifying the original class may include adding a field to the class, adding a method to the class, copying and/or pasting code from one method into another method, modifying and/or adding one or more instructions in a method, and accessing a field rather than a local variable.

In one or more embodiments, when adding a field, the access specifier of the field (e.g., public, static, final) as well as its type (e.g., java/lang/Integer, java/lang/Double) and name should be provided. When adding a method to a class, the method's formal argument list and name should be provided. Subsequently, any instructions containing the functionality of the method should be added. Cutting and pasting code from one method into another method may include remapping all labels in the original method containing the code being cut to new labels in the method in which the code is being pasted. As such, each instruction may be virtually duplicated and pasted into the new method and the original method instruction can be deleted.

For example, the parallelization agent 244 may perform a technique which reduces the number of transactions required in the parallelized code segment using temporary variables. In the example code segment to be parallelized, as illustrated below, various iterations of the outer loop will occur simultaneously in independent threads after parallelization. This means that each update to inCircleCount and inSquareCount will occur within its own transaction. Because these updates occur within an inner loop, a large number of transactions will be generated. As such, a speedup from parallelization may be achieved, but it may not be optimized.

```
for (double x = XSTART; x < XSTOP; x+=DELTA)
{
    for (double y = YSTART; y < YSTOP; y+=DELTA)
    {
        double rSquared = x*x + y*y;
        if (rSquared < RADIUS_SQUARED)
        {
            inCircleCount++; //var declared outside of loop scope
        }
        inSquareCount++; //var declared outside of loop scope
    }
}
```

In the example code segment to be parallelized, as illustrated below, the technique which reduces the number of transactions required in the parallelized code segment has been performed by the parallelization agent 244.

```
for (double x = XSTART; x < XSTOP; x+=DELTA)
{
    long tempInCircleCount = 01;
    long tempInSquareCount = 01;
    for (double y = YSTART; y < YSTOP; y+=DELTA)
    {
        double rSquared = x*x + y*y;
        if (rSquared < RADIUS_SQUARED)
        {
            tempInCircleCount++;
        }
        tempInSquareCount++;
    }
    inCircleCount += tempInCircleCount;
    inSquareCount += tempInSquareCount;
}
```

This transformed loop achieves a speedup of approximately 6 times that of the previously illustrated loop. The technique performed by the parallelization agent 244 may include storing the count values in temporary variables which are loop local and updating them once per outer loop iteration (rather than inner loop iteration). In turn, a reduction in the number of transactions is created. The technique performed by the parallelization agent 244 may include identifying inner loops and determining which transaction-guarded variables updated in the inner loops are able to be modified to operate using temporary, thread-local variables. The technique performed by the parallelization agent 244 may further include transforming the instructions in the loop such that the inner loop operates on these temporary variables.

As discussed above, the verification agent 242 may include optimization and verification functionality. An optimization component may ensure that the parallel code is partitioned near-optimally for the underlying hardware architecture. For example, the optimization component may receive a set of the parallelized executable programs 230' and the execution profile produced by the profiling agent 249. The optimization component may generate a set of re-instrumented executable programs derived from the set of the parallelized executable programs 230' and the execution profile. The re-instrumented executable programs may be partitioned such that the work distribution between a number of threads is near optimal for the underlying hardware architecture.

In certain embodiments, a verification component may analyze the parallelized code segment to determine whether the parallel transformation introduced any errors into the original code segment. Similar to the verification component described above in relation to the operating environment 100, the verification component of the environment 240 may receive a set of optimal or near optimally parallelized executable programs produced by the optimization component, a set of test vectors 246 and a model of expected behavior 248.

In certain embodiments, the model of expected behavior 248 in the operating environment 200 may be provided by a programmer, administrator and the like while the test vectors 246 may be generated by a component of the system 200 such as, for example, the verification agent 242. As such, unlike traditional unit testing, the verification component of the verification agent 242 may generate test cases automatically at run time.

As discussed above, the test vectors 246 may include the inputs to the method being verified ("test vector inputs") and the method return type ("test vector output"). The model of expected behavior 248 may include all observed input/output sets for the method being verified during its execution over several thousand invocations. As such, the verification component may compute an input hash value of the test vector inputs and an output hash value of the test vector output and then invoke a verification method whose arguments are the input hash value and the output hash value.

The verification method may be executed as described above relative to the test vectors 146 and model of expected behavior 148 of FIG. 1. In some embodiments, the operating environment 200 may include functionality in addition to that described above relative to the static operating environment 100 of FIG. 1. For example, the environment 240 may include a consistency monitor 245. The consistency monitor 245 may create a set of test vectors 246 and may trigger the verification component of the verification agent 242 for verifying that the parallel transformation did not introduce any errors into the original code. Further, the verification process may be unsuitable for deployment in a production system. As such, the verification process may include first instrumenting a set of binaries (e.g., executable programs 230) to be parallelized and allowing the system to run in a controlled context simulating real-world use. In such a scenario, models of expected behavior 248 may be automatically generated.

As can be appreciated, the operating environment 200 may include advantages such as data independence. For example, if speedups are observed by the profiling agent 249 with large workloads, the parallelization agent 244 may not trigger a transformation of the code if only small workloads are observed in reality. As such, some embodiments provide that parallelization is only used in the operating environment 200 when it provides a noticeable benefit. In one embodiment, the parallelization agent 244 may interface with a graphical user interface to allow manual control of the transformation process. This control may include which code segments should be parallelized, when the segments should be parallelized etc. For example, the graphical user interface may display a hierarchy of classes and class methods contained in a directory in addition to the parallelization status of each method. A user, for example, may browse this hierarchy and select individual methods to parallelize. When parallelizing a method, the user may be prompted for the number of threads the method should be run with. The number of threads used by the method may be determined automatically by the optimization framework.

Figure 3:
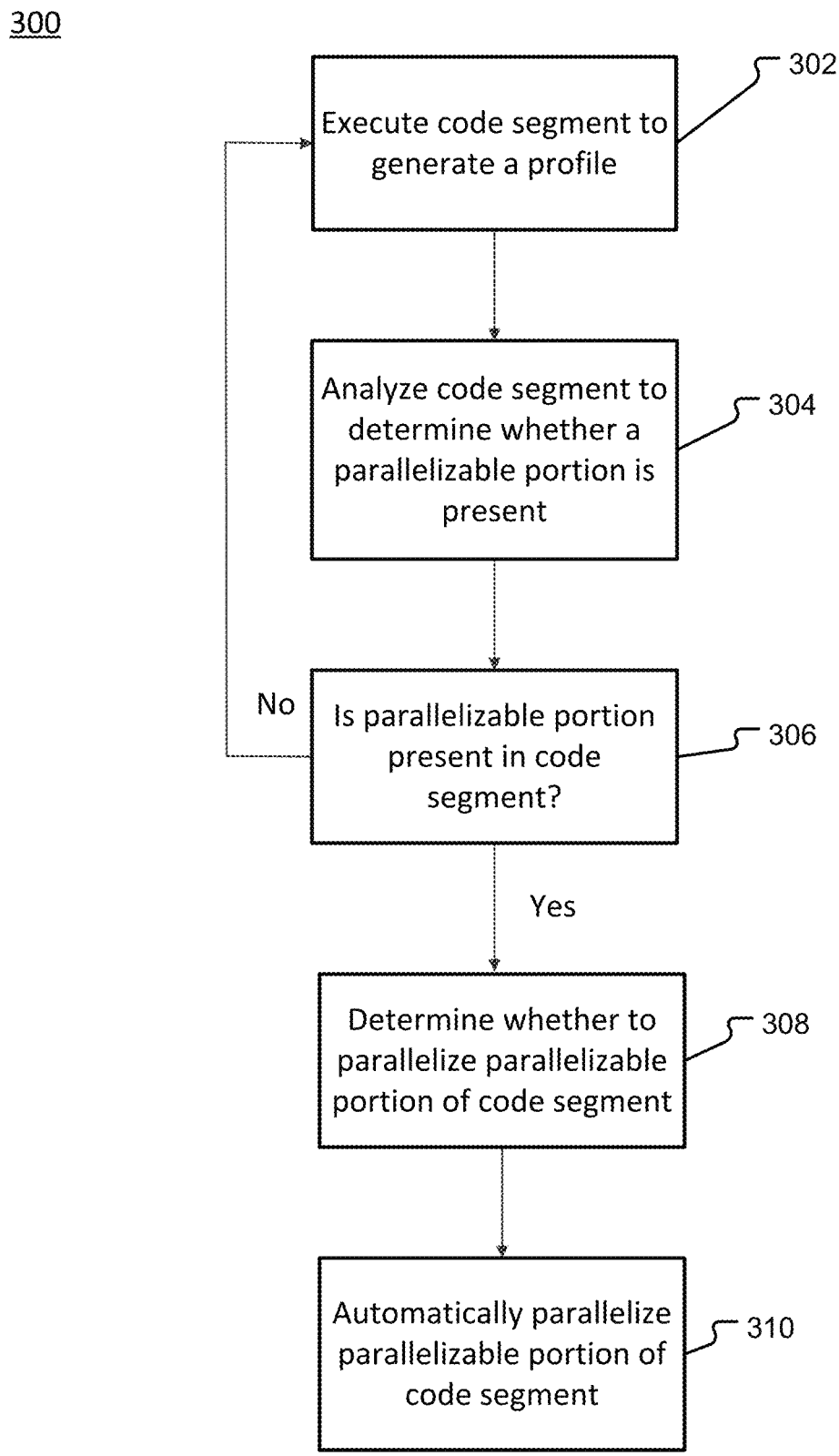
FIG. 3 is a flow diagram illustrating operations for determining whether a code segment should be parallelized according to a first embodiment of the present disclosure.

FIG. 3 illustrates a method 300 for determining whether a code segment should be parallelized according to one or more embodiments of the present disclosure. Method 300 begins at operation 302 in which a code segment is executed to generate a profile. For example, source code may be received at a compiler and the compiler may create an executable file from the source code. The executable file may be executed such that it invokes a method in the profiling agent that determines which methods in the executable file are taking the most processor time. In turn, the profiling agent may generate a profile of the executed code segment. As such, the profile of the executed code segment may include statistics regarding processor times during execution of the code segment. The code segment may be one of a binary code segment, a method in a code base, or a class in a code base.

Method 300 continues to operation 304 in which the code segment is analyzed to determine whether a parallelizable portion is present in the code segment. For example, the parallelization agent may receive the code segment and the profile of the executed code segment from the profiling agent. When the code segment and the profile of the executed code segment are received at the parallelization agent, the parallelization agent may analyze a read-modify-write sequence of instructions for a local variable of a portion of the code segment (e.g., sequential loop iterations such as for( ) while( ) and do while( ) loops) and determine whether the sequence contains a modification operation that is reducible. If the modification operation is reducible, the code segment is a parallelizable structure.

At operation 306, when a parallelizable portion is present in the code segment, flow proceeds to operation 308 where it is determined, based on the profile of the executed code segment, whether to parallelize the parallelizable portion of the code segment. For example, the parallelization agent may analyze the profile of the executed code segment and compare it against the parallelizable portion of the code segment to determine whether it is beneficial to parallelize the parallelizable portion of the code segment. In certain embodiments, the determination may be based on how much processor time the parallelizable portion of the code segment took to execute. In other embodiments, the determination may be based on the number of times the parallelizable portion of the code segment is called during execution of the program.

At operation 306, when a parallelizable portion is not present in the code segment, the code segment is not parallelized, and flow proceeds back to operation 302. When it is determined that a parallelizable portion is present in the code segment and it is determined that the code segment is to be parallelized, flow proceeds to operation 310 where the parallelizable portion of the code segment is automatically parallelized (e.g., transformed) based on the profile of the executed code segment. Automatically parallelizing the parallelizable portion of the code segment may include modifying the original code segment to be parallelized/transformed and creating a new parallelized code segment. The new parallelized code segment may contain the functionality of the original code segment's sequential loop iterations.

Figure 4:
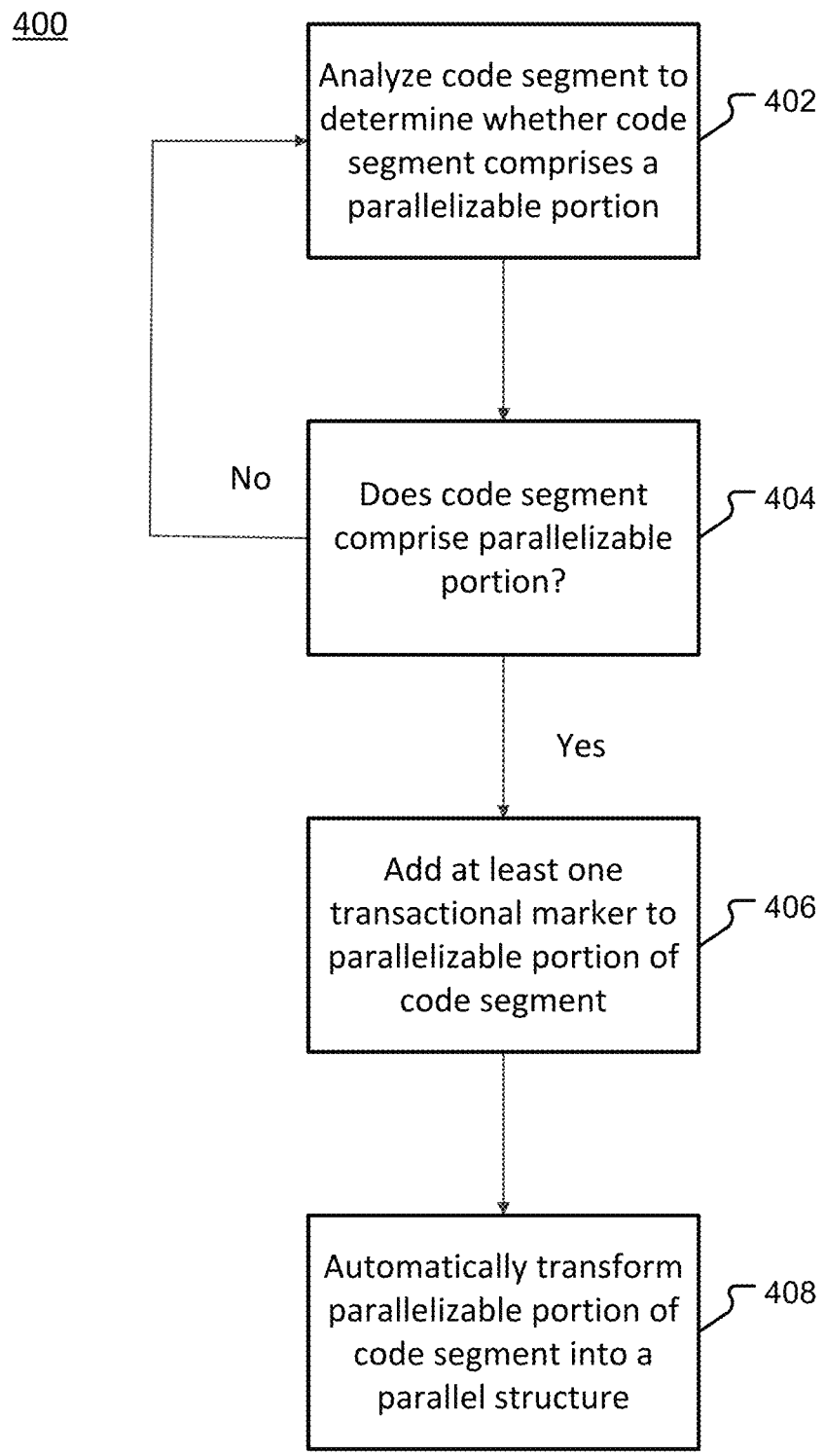
FIG. 4 is a flow diagram illustrating operations for determining whether a code segment should be parallelized according to a second embodiment of the present disclosure.

FIG. 4 illustrates a method 400 for determining whether a code segment should be parallelized according to one or more embodiments of the present disclosure. In one embodiment, a method 400 begins at operation 402 in which the code segment is analyzed, at compile time, to determine whether a parallelizable portion is present in the code segment. For example, the parallelization agent may receive the code segment and may analyze a read-modify-write sequence of instructions for a local variable of a portion of the code segment (e.g., sequential loop iterations such as for( ) while( ) and do while( ) loops) and determine whether the sequence contains a modification operation that is reducible. If the modification operation is reducible, the code segment is identified as a parallelizable structure.

At operation 404, when it is determined that a parallelizable portion is present in the code segment, flow proceeds to operation 406 where at least one transactional marker is added to the parallelizable portion of the code segment. The transactional marker may at least partially control access to memory. For example, the transactional marker may enforce a transactional memory contract for concurrent data accesses to shared data. The transactional marker may be implemented with either software or hardware (JVM) support for transactional memory. At operation 404, when a parallelizable portion is not present in the code segment, the code segment is not parallelized, and flow proceeds back to operation 402.

After operation 406, flow proceeds to operation 408 where the parallelizable portion of the code segment is automatically transformed into a parallel structure. Automatically parallelizing the parallelizable portion of the code segment may include modifying the original code segment to be parallelized/transformed and creating a new parallelized code segment. The new parallelized code segment may contain the functionality of the original code segment's sequential loop iterations.

Figure 5:
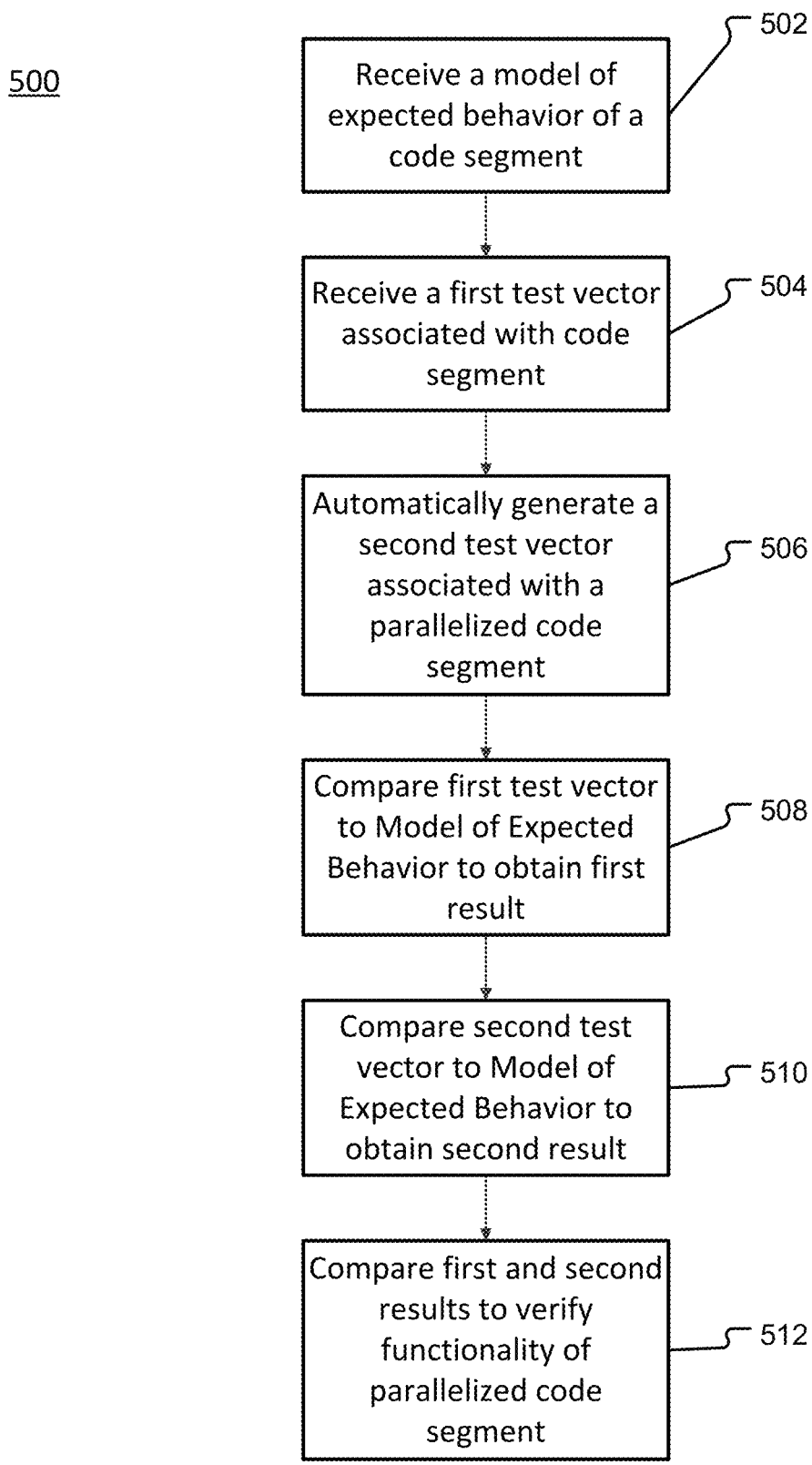
FIG. 5 is a flow diagram illustrating operations for verifying the functionality of a parallelized code segment according to a first embodiment of the present disclosure.

FIG. 5 illustrates a method 500 of verifying functionality of a parallelized code segment according to one or more embodiments of the present disclosure. In one embodiment, a method 500 begins at operation 502 in which a model of expected behavior of a code segment is received by the verification agent. For example, the model of expected behavior may be provided to the verification agent by a programmer, administrator, and the like. The model of expected behavior may include all observed input/output sets for the code segment being verified during its execution over several thousand invocations.

After operation 502, flow proceeds to operation 504 where a first test vector associated with the code segment is received. For example, the first test vector may be provided to a verification agent by a programmer or other user. The first test vector may include the inputs to the code segment being verified and the code segment return type.

After operation 504, flow proceeds to operation 506 where a second test vector associated with a parallelized code segment is automatically generated during execution of the parallelized code segment. The second test vector may be created by the verification agent for the parallelized code segment and may include the inputs to the parallelized code segment and the parallelized code segment return type. The parallelized code segment may be derived from the first code segment. For example, when it is determined to parallelize the first code segment, as discussed above in relation to FIG. 3, the first code segment may be parallelized.

After the second test vector is automatically generated during execution of the parallelized code segment, flow proceeds to operation 508 where the first test vector is compared to the model of expected behavior to obtain a first result. For example, the verification agent may compute an input hash value of the first test vector inputs and an output hash value of the first test vector output and compare the input hash value with the model of expected behavior to find a match between the input hash value and observed input sets of the model of expected behavior. The verification agent may then compare the output hash with the model of expected behavior to obtain a first result.

After the first test vector is compared to the model of expected behavior to obtain a first result, flow proceeds to operation 510 where the second test vector is compared to the model of expected behavior to obtain a second result. For example, the verification agent may compute an input hash value of the second test vector inputs and an output hash value of the second test vector output and compare the input hash value with the model of expected behavior to find a match between the input hash value and observed input sets of the model of expected behavior. The verification agent may then compare the output hash with the model of expected behavior to obtain a second result. Flow then proceeds to operation 512 where the first result and second result are compared to verify functionality of the parallelized code segment.

Figure 6:
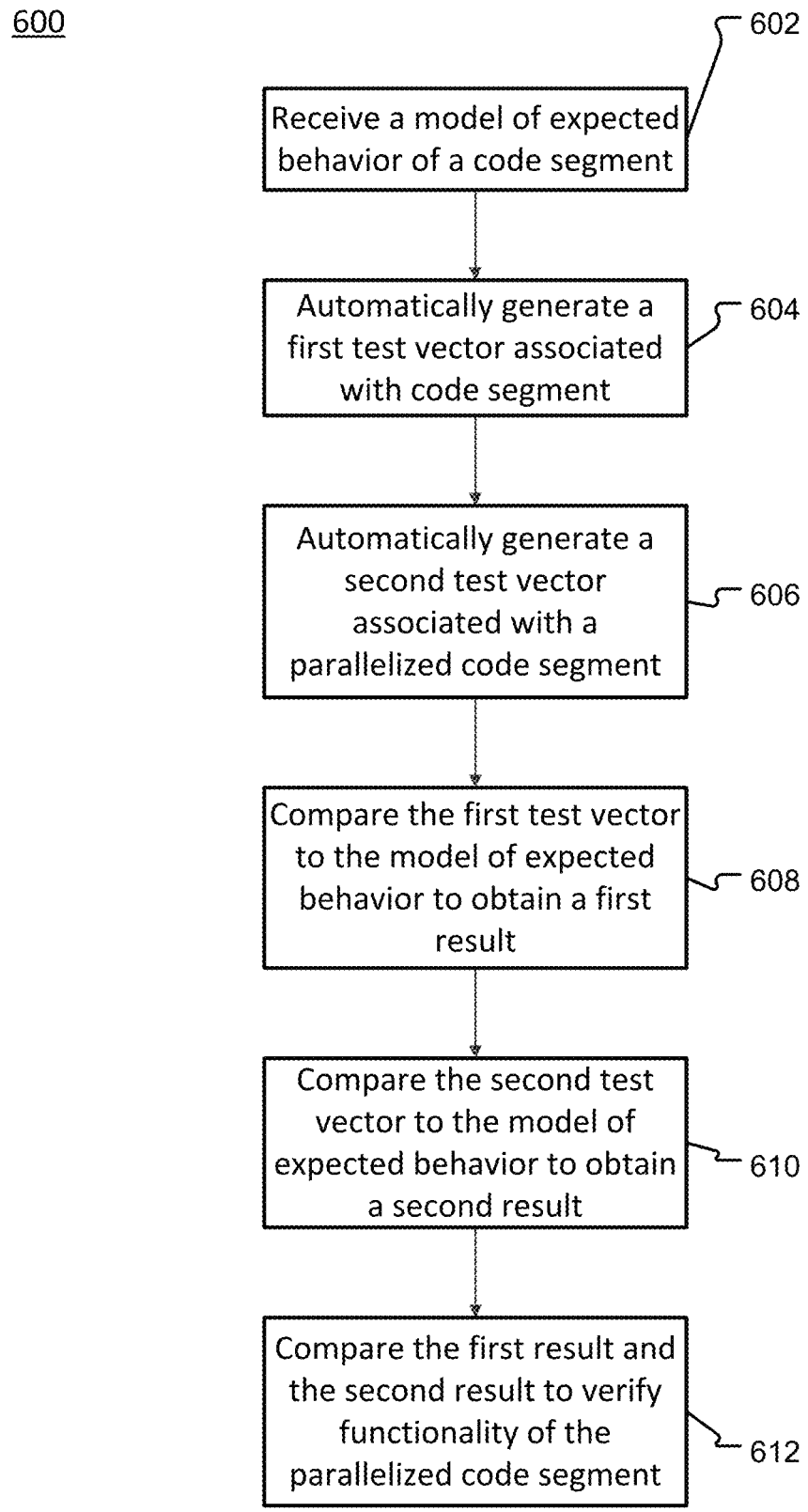
FIG. 6 is a flow diagram illustrating operations for verifying the functionality of a parallelized code segment according to a second embodiment of the present disclosure.

FIG. 6 illustrates a method 600 for verifying the functionality of a parallelized code segment according to one or more embodiments of the present disclosure. In one embodiment, the method 600 begins at operation 602 in which a model of expected behavior of a code segment is received by the verification agent. For example, the model of expected behavior may be provided to the verification agent by a programmer, administrator or other such user. The model of expected behavior may include all observed input/output sets for the code segment being verified during its execution over several thousand invocations.

After operation 602, flow proceeds to operation 604 where a first test vector associated with the code segment is automatically generated during execution of the code segment. For example, the first test vector may be created by the verification agent for the code segment. The first test vector may include the inputs to the code segment being verified and the code segment return type.

After operation 604, flow proceeds to operation 606 where a second test vector associated with a parallelized code segment is automatically generated during execution of the parallelized code segment. In certain embodiments, the second test vector may be created by the verification agent for the parallelized code segment and may include the inputs to the parallelized code segment and the parallelized code segment return type. The parallelized code segment may be derived from the code segment. For example, the parallelized code segment may be derived from the code segment when the code segment is determined to be parallelizable and when it is determined to parallelize the parallelizable code segment, as discussed above in relation to FIG. 3.

After the second test vector is automatically generated during execution of the parallelized code segment, flow proceeds to operation 608 where the first test vector is compared to the model of expected behavior to obtain a first result. For example, the verification agent may compute an input hash value of the first test vector inputs and an output hash value of the first test vector output and compare the input hash value with the model of expected behavior to find a match between the input hash value and observed input sets of the model of expected behavior. The verification agent may then compare the output hash with the model of expected behavior to obtain a first result.

After the first test vector is compared to the model of expected behavior to obtain a first result, flow proceeds to operation 610 where the second test vector is compared to the model of expected behavior to obtain a second result. For example, the verification agent may compute an input hash value of the second test vector inputs and an output hash value of the second test vector output and compare the input hash value with the model of expected behavior to find a match between the input hash value and observed input sets of the model of expected behavior. The verification agent may then compare the output hash with the model of expected behavior to obtain a second result. Flow then proceeds to operation 612 where the first result and second result are compared to verify functionality of the parallelized code segment.

Figure 7:
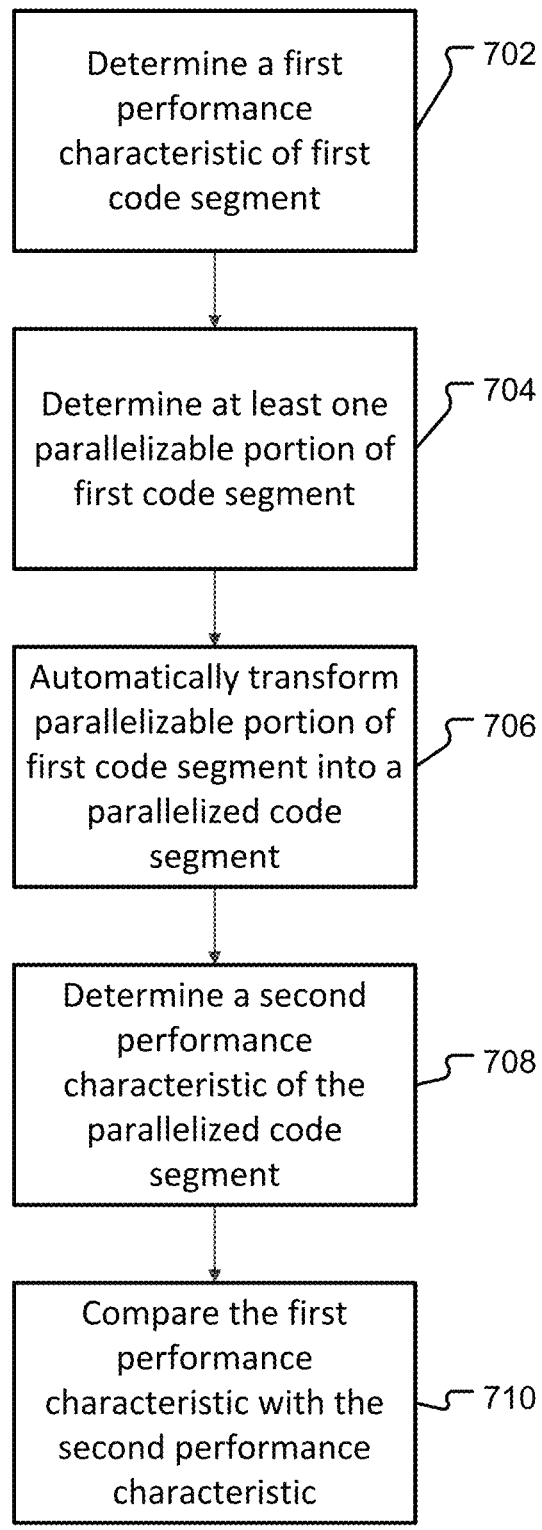
FIG. 7 is a flow diagram illustrating operations for comparing pre-transformation and post-transformation performance profiles to determine whether a code segment should be parallelized according to an embodiment of the present disclosure.

FIG. 7 illustrates a method for comparing pre-transformation and post-transformation performance profiles to determine whether a code segment should be parallelized according to one or more embodiments of the present disclosure. In one embodiment, the method 700 begins at operation 702 in which a first performance characteristic of a first code segment is determined during execution of the first code segment. For example, while the first code segment is being executed, the profiling agent may transform the first code segment to track how long it takes to execute, i.e., what the processor time is to execute the first code segment. In this regard, the first performance characteristic may include the processor time for executing the first code segment. The processor time for executing the first code segment may be based on the number of times the code segment is executed and/or the type of structure of the code segment, for example.

After a first performance characteristic of the first code segment is determined, flow proceeds to operation 704 where at least one parallelizable portion of the first code segment is determined based on the first performance characteristic. For example, the parallelization agent may analyze a read-modify-write sequence of instructions for a local variable of a portion of the code segment (e.g., sequential loop iterations such as for( ), while( ) and do while( ) loops) and determine whether the sequence contains a modification operation that is reducible. If the modification operation is reducible, the code segment may include a parallelizable structure. The parallelization agent may analyze the first performance characteristic of the first code segment and compare it against the portion of the first code segment determined to be parallelizable to determine whether it is beneficial to parallelize the parallelizable portion of the code segment based on first performance characteristic, e.g., how much processor time the parallelizable portion of the code segment took to execute.

Flow then proceeds to operation 706 after at least one parallelizable portion of the first code segment is determined. Operation 706 includes automatically transforming the parallelizable portion of the first code segment into a parallelized code segment. Automatically parallelizing the parallelizable portion of the code segment may include modifying the original code segment to be parallelized/transformed and creating a new parallelized code segment. The new parallelized code segment may contain the functionality of the original code segment's sequential loop iterations.

Next, flow proceeds to operation 708 where a second performance characteristic is determined during execution of the parallelized code segment. For example, while the parallelized code segment is being executed, the profiling agent may transform the parallelized code segment to track how long it takes to execute, i.e., what the processor time is to execute the parallelized code segment. In this regard, the second performance characteristic may include the processor time for executing the parallelized code segment.

Flow then proceeds to operation 710 where the first performance characteristic is compared with the second performance characteristic. For example, the processor time to execute the first code segment may be compared with the processor time to execute the parallelized code segment to determine whether a speedup was achieved by transforming/parallelizing the first code segment.

Figure 8:
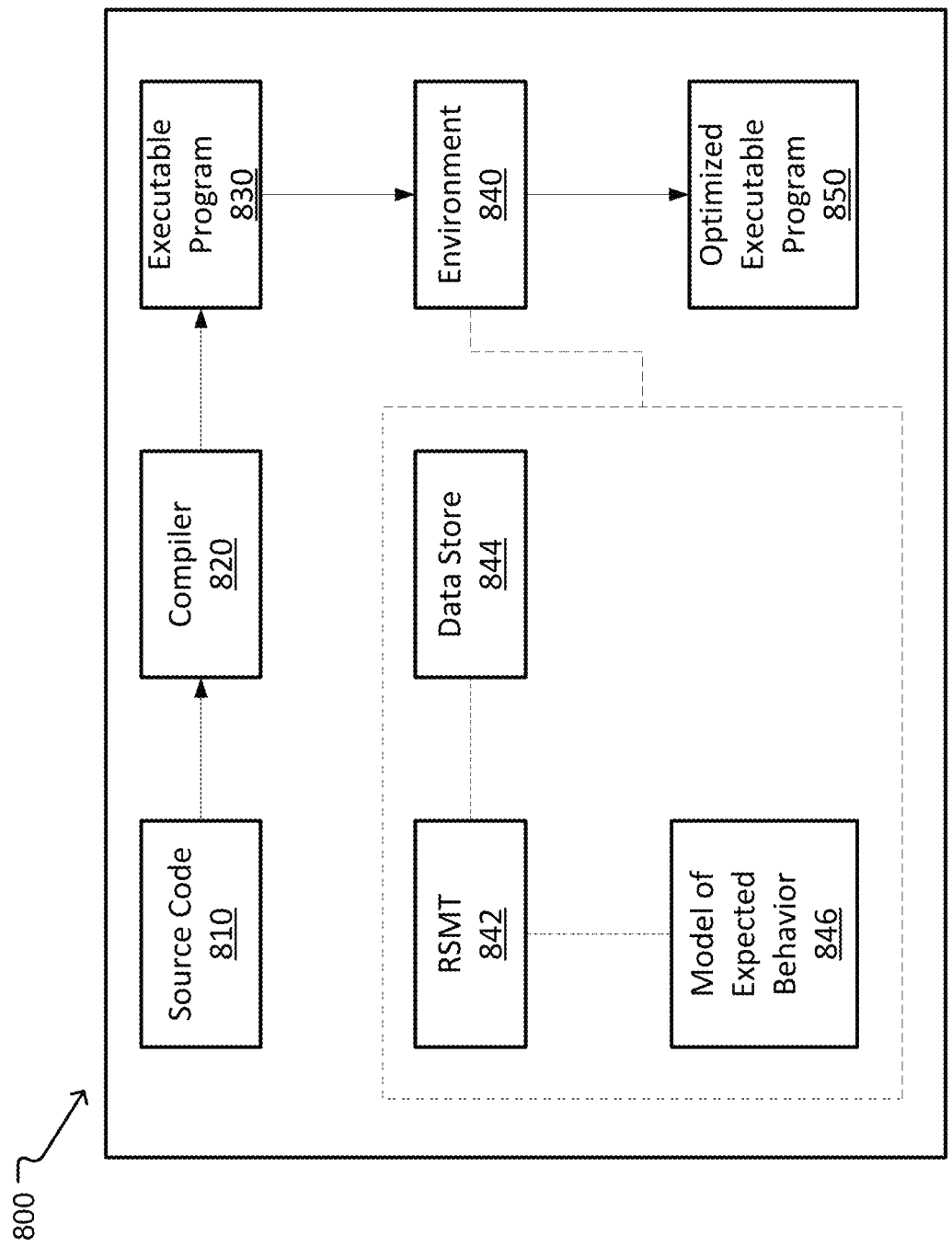
FIG. 8 is a block diagram illustrating an operating environment for reducing the attack surface of a code segment according to an embodiment of the present disclosure.

FIG. 8 illustrates an operating environment 800 for reducing the attack surface of a code segment according to one or more embodiments. As shown in FIG. 8, the operating environment 800 may include source code 810, a compiler 820, an executable program 830, an execution environment 840, and an optimized executable program 850. Execution environment 840 may include Robust Software Modeling Tool (RSMT) 842, data store 844, and a model of expected behavior 846. The operating environment 800 may include a configuration in which one or more of the present embodiments may be implemented during execution/runtime of the executable program 830. In aspects, source code 810, a compiler 820, an executable program 830, an execution environment 840, and an optimized executable program 850 may be respectively configured similar to the components described above with respect to FIG. 1 (e.g., respective source code 110, a compiler 120, an executable program 130, environment 140, and executable program 130'). In this regard, operating environment 800 may include all or portions of the functionality described with respect to operating environment 100 of FIG. 1.

RSMT 842 may be configured to provide for reducing the attack surface of a code segment. An RSMT, as used herein, may refer to a platform-independent set of software tools/utilities. The RSMT may provide for accessing, evaluating and/or testing executable code. In aspects, the evaluation/testing may comprise parsing the executable code and associating (e.g., applying, inserting, etc.) one or more shims with the executable code. A shim, as used herein, may refer to a code library that transparently intercepts API calls and processes operations based thereon. In examples, shims may be associated with various locations within the executable code. Shims may be associated manually, automatically at predetermined locations, or automatically at locations determined during the evaluation/testing. In at least one example, the automatic shim association process may require no prior understanding of the executable code. In operating environment 800, shims may be used to record information about one or more classes, methods, instruction, or the like. For example, a shim may record behavior and/or control flow events, such as when a method is entered, the execution path taken through the method, instructions associated with the method, when the method is exited, etc. The behavior events may be recorded to one or more data stores, such as data store 844. In examples, data store 844 may be stored local to execution environment 840, local to operating environment 800, remotely to operating environment 800, or some combination thereof.

In aspects, after one or more shims have been associated with the executable code, the executable code comprising the shim(s) may be executed. The RSMT may analyze the behavior and/or control flow events, generated by the execution of the executable code comprising the shim(s). In examples analyzing the events may include using one or more machine learning models. A model, as used herein, may refer to a predictive or statistical language model that may be used to determine a probability distribution over one or more word, character sequences or events, and/or to predict a response value from one or more predictors. In examples, a model may be a rule-based model, a machine-learning regressor, a machine-learning classifier, a neural network, or the like. In some aspects, a machine learning model may be used to identify unused code segments, vulnerable code segments, or unoptimized code segments. For example, a machine learning model may receive as input behavior and/or control flow events for one or more code segments. Based on the input, the machine learning model may output a behavioral analysis of the critical execution path and/or non-critical execution paths. The RSMT may use the behavioral analysis to identify unused and/or vulnerable code segments, expected behavior(s), and/or optimizable code segments.

In aspects, the RSMT may implement one or more actions based on one or more behavioral analyses. For example, if a behavioral analysis identifies unused and/or vulnerable code segments, the RSMT may cause the removal or suppression of the identified code segments, or associated classes, methods or control flow thereof. RSMT may then generate (or cause to be generated) a smaller/compressed version of the code segment having a reduced attack surface. As another example, if a behavioral analysis identifies optimizable portions of code segments, the RSMT may perform (or facilitate the performance of) one or more optimization processes (e.g., code parallelization, resource reallocation, etc.) on the code segment to produce optimized code, such as optimized executable code 850. As yet another example, a behavioral analysis may identify the expected behavior of the code segment. The RSMT may generate and/or store a behavior model, such as model of expected behavior 846, representing the expected behavior. The RSMT may then subsequently evaluate the behavioral model at runtime against received code segments to detect anomalous behavior in real-time. Examples of anomalous behavior may include behavior caused by SQL injection attacks, reflection attacks, command string insertion attacks, complexity vulnerability attacks, bugs, viruses, etc. When anomalous behavior is detected, the RSMT may perform one or more corrective actions, such as autonomically repairing the code segment, halting execution of the code segment, or providing a notification of the anomalous behavior.

Figure 9A:
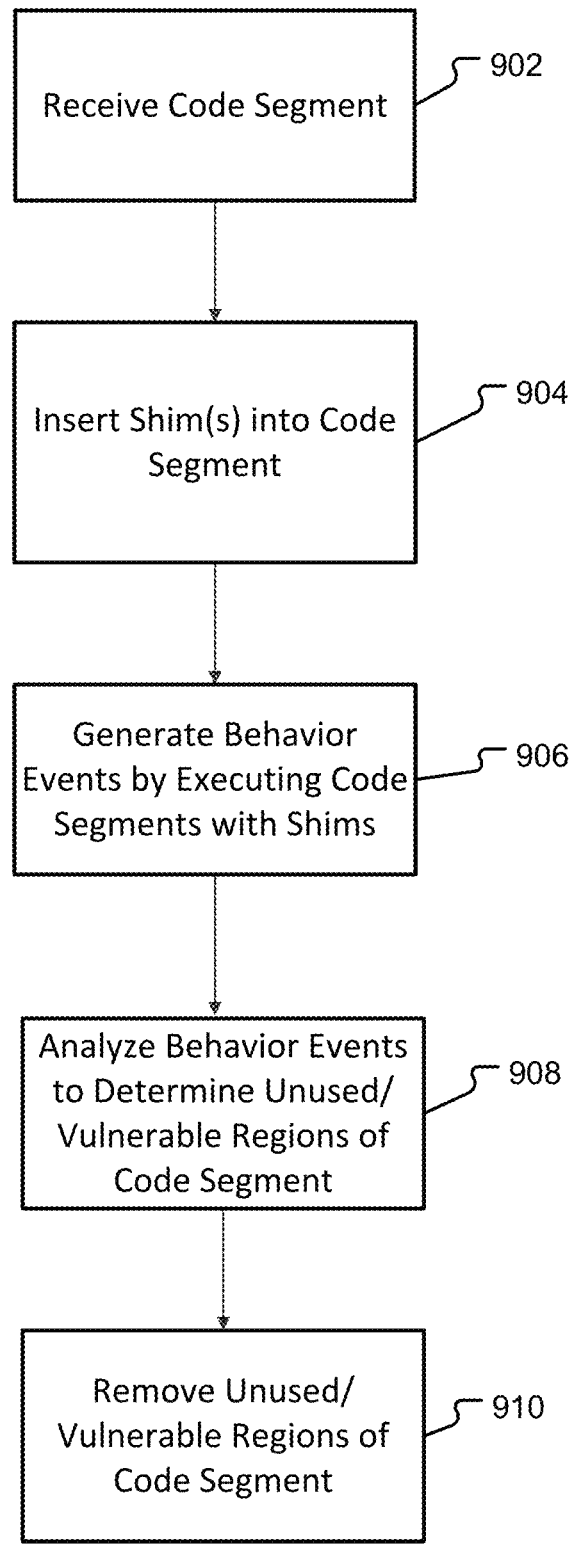
FIG. 9A is a flow diagram illustrating operations for reducing the attack surface of a code segment according to an embodiment of the present disclosure.

FIG. 9A illustrates a method 900 for reducing the attack surface of a code segment according to one or more embodiments of the present disclosure. Method 900 begins at operation 902 where a code segment may be received. In aspects, the code segment may comprise compiled bytecode corresponding to, or representing, a document, a code library, an application, a service, a file or portions thereof. The code segment may be received by a Robust Software Modeling Tool (RSMT), such as RSMT 842. The RSMT may test and/or evaluate the code segment to identify potential shim association points and/or to determine one or more abstractions. For example, the RSMT may determine a received code segment was written in a coding language that supports Java Virtual Machine (JVM) bytecode, such as Java, Scala, Groovy, Clojure, Jruby, Jyhton, etc. As such, Java-based implementations generally use certain structures and classes, the RSMT may use the determination to identify effective and/or predetermined locations to associate the shims. As another example, the RSMT may use a received code segment to generate one or more code abstractions. FIGS. 9B-D illustrate examples of such code abstractions. For example, FIG. 9B illustrates a compilation abstraction in which a .jar file is organized into classes, methods are identified for one or more if the classes, and particular instructions in the methods are identified. FIG. 9C illustrates a dynamic analysis abstraction comprising a call trace of interconnected nodes and a corresponding call graph. FIG. 9D illustrates a static analysis abstraction in which an instruction tree comprises various configuration blocks or nodes representing control flow statements.

Figure 9E:
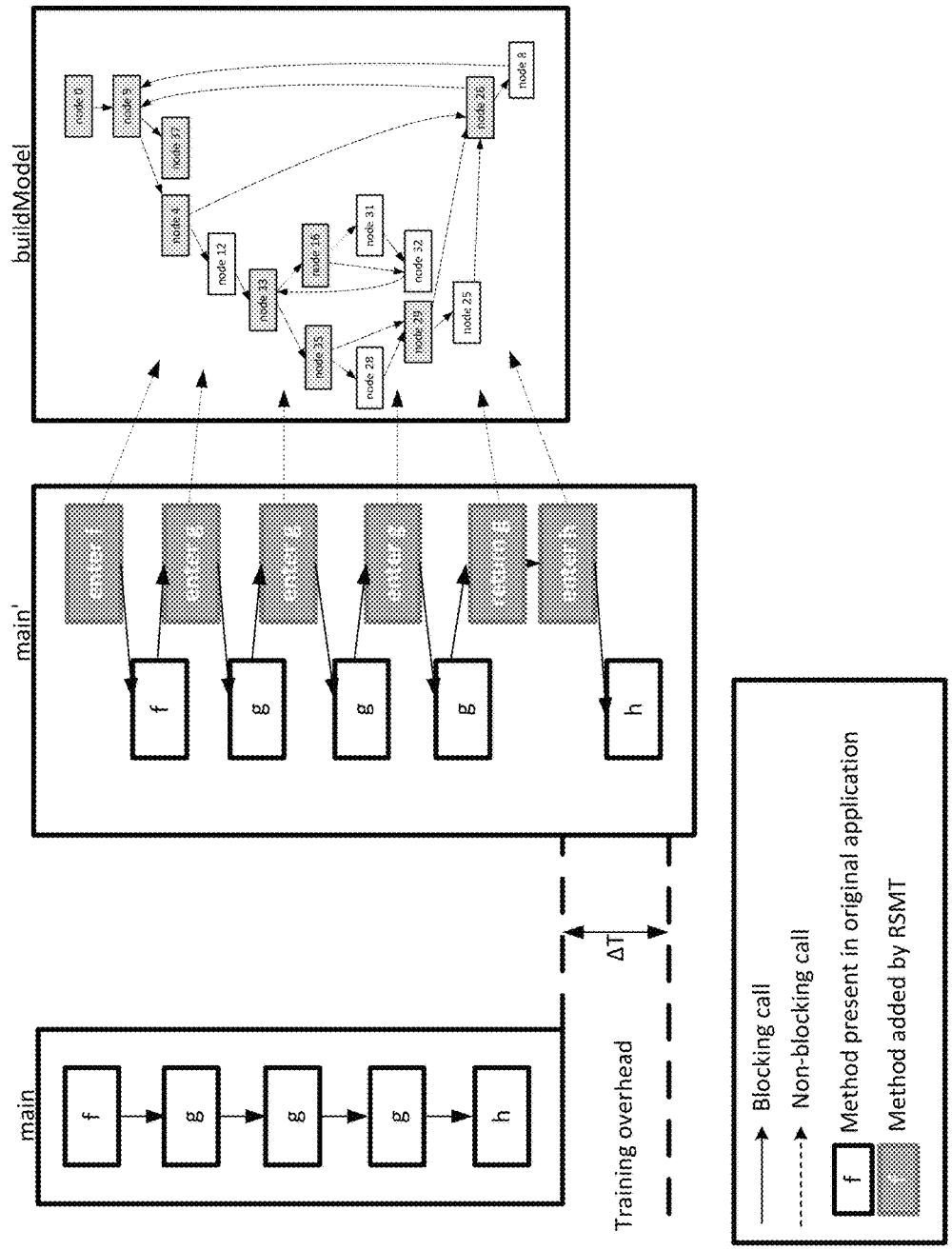
FIG. 9E illustrates the injection of behavior tracing API calls into a code segment during instrumentation of the code segment.

At operation 904, shims may be associated with a code segment. In aspects, the code segment may be instrumented to add, for example, tracing behavior instructions. In examples, instrumenting the code segment may include associating one or more shims at association points identified by, or known by, an RSMT. The shims may be added by the RSMT during a pre-runtime testing/evaluation phase. The shims may be operable to record behavior instructions for the code segment to one or more storage locations, such as data store 844. FIG. 9E illustrates behavior tracing API calls injected into a code segment during instrumentation. As shown in FIG. 9E, 'main' represents an executable code segment comprising methods 'f', 'g' and 'h.' The control flow for 'main' comprises four (4) blocking calls: method f to method g, method g to method g, method g to method g, and method g to method h. During a testing phase, 'main' has been instrumented with behavior tracing API calls represented by the 'enter f' method, the 'enter g' methods, the 'return g' method, and the 'enter h' method; thereby, generating executable code segment 'main': The conceptualized build model for main' is represented by 'buildModel.'

At operation 906, behavior events for a code segment may be generated. In aspects, an RSMT may (re)execute a code segment after the code segment has been evaluated and/or one or more shims have been associated with the code segment. The code segment may be (re)executed manually or automatically via, for example, a unit test, an integration test, a validation test, or the like. When the code segment comprising the shim(s) is (re)executed, the shim(s) may generate (or cause to be generated) behavioral events. In examples, the behavioral events may correspond to one or more classes, methods, instructions, control flows, or portions thereof. For instance, behavioral instructions may be generated for each branch of a method in a code segment. The behavioral events may be stored in one or more data stores accessible to the RSMT. The behavioral events may be recorded and/or stored such that relationships, dependencies, and/or execution paths for the method are discernable. For instance, a graphical representation (e.g., a tree structure, linked graph, etc.) of the execution path (and associated behavioral events) of a method may be stored.

Figure 10:
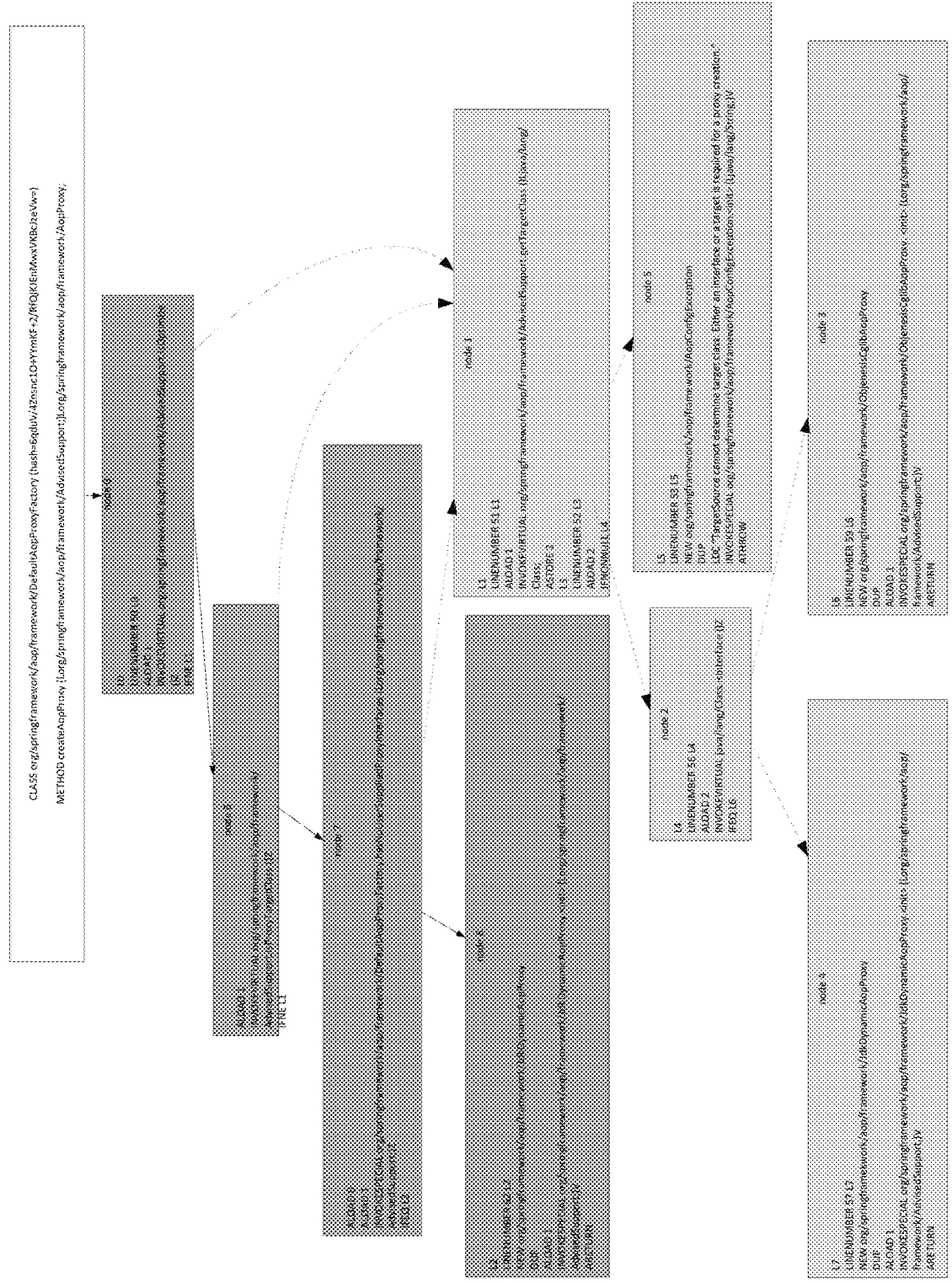
FIG. 10 illustrates a graphical representation of an analyzed method according to an embodiment of the present disclosure.

At operation 908, behavioral events for a code segment may be analyzed. In aspects, an RSMT may have access to behavioral events recorded for one or more portions of a code segment. The behavioral event may be aggregated, organized and/or analyzed. In examples, the behavioral events may be analyzed using one or more machine learning models. For example, one or more portions of the behavioral events may be provided as input to a statistical model or a code modeling utility. The model (or modeling utility) may provide as output an analysis of the code region corresponding to one or more associated shims. The analysis may be in the form of a model of expected behavior for the code segment, a textual report, a graphical illustration of the evaluated code segment or some combination thereof. For example, FIG. 10 illustrates a graphical representation of the analyzed method createAopProxy of the class DefaultAopProxyFactory. As shown, the createAopProxy method comprises 10 nodes (e.g., nodes 0-9), each of which corresponds to a set of instructions. Each of the ten nodes and their respective control flows have been analyzed.

In aspects, code segment analyses may include determining unused, vulnerable and/or unoptimized code regions. For example, a behavioral event analysis may determine that several code libraries included in (or referenced by) a code segment are missing or have been moved or modified. As a result, the RSMT may cause portions of the code segment to be inoperable or inaccessible. As another example, a behavioral event analysis may determine that portions of a code segment comprise code that is malicious or potentially harmful. Such a determination may include evaluating the code portions against one or more services or data stores comprising code known (or suspected) to be malicious. As a result, the RSMT may provide notifications corresponding to the potentially harm code segment and/or cause portions of the code segment to be inoperable or inaccessible. As yet another example, a behavioral event analysis may determine that a code segment comprises aspects that are optimizable. Such a determination may include evaluating the code segment using one or more of the components of FIGS. 1 and 2. For instance, a code segment may be provided to and/or evaluated by profiling agents 149 and 249, parallelization agents 144 and 244, or other components operable to identify and/or perform optimizations. Examples of optimizations may include improvements to code quality and efficiency, reduction of code size, reduction of memory and storage requirements, reduction of I/O operations, parallelization of operations, identifying and disabling/removing unused and/or malicious code regions, the ability to use computing resources that have become available after the code segments have been executed without needing to restart or re-execute the code segments, etc.

At operation 910, unused and/or vulnerable regions of a code segment may be removed or otherwise modified. In aspects, an RSMT may remove or disable code regions identified in operation 908 as unused, vulnerable and/or unoptimized. As an example, in FIG. 10, the analysis has determined that nodes 1-5 are unused and/or unusable by the createAopProxy method. As a result, nodes 1-5 have been marked for removal. In examples, disabling code regions may include commenting out one or more portions of the code segment, such that the commented out code will not execute when the code segment is executed. Disabling the code regions may also include removing links to one or more code libraries, modifying permission to other files and code libraries, adding code instructions to ignore the conditions that would cause the code regions to execute, etc. Removing code regions may include removing corresponding classes, methods, code libraries and the like. In examples, after one or more code regions have been removed, the RSMT may cause the code segment to be recompiled or otherwise regenerated without the removed code and/or without the associated shims. In such examples, the modified code segment may comprise a reduced attack surface. In other aspects, the RSMT may optimize the code regions identified in operation 908. For example, the RSMT may provide the code segment (or portions thereof) to a parallelization agent. The parallelization agent may then parallelize the code segment, as described above, to generate a modified code segment. As another example, the code segment may be provided to an optimization component. The optimization component may evaluate the state of the system and/or execution environment to determine, for example, available system resources. Based on the evaluation, the optimization component may cause the identified resources to be allocated for executing the modified code segment. In some aspects, the modified code segment (in which code regions have been disabled or removed) may then be deployed to an execution environment, such as JVM 150 and JVM Core 250.

Figure 11:
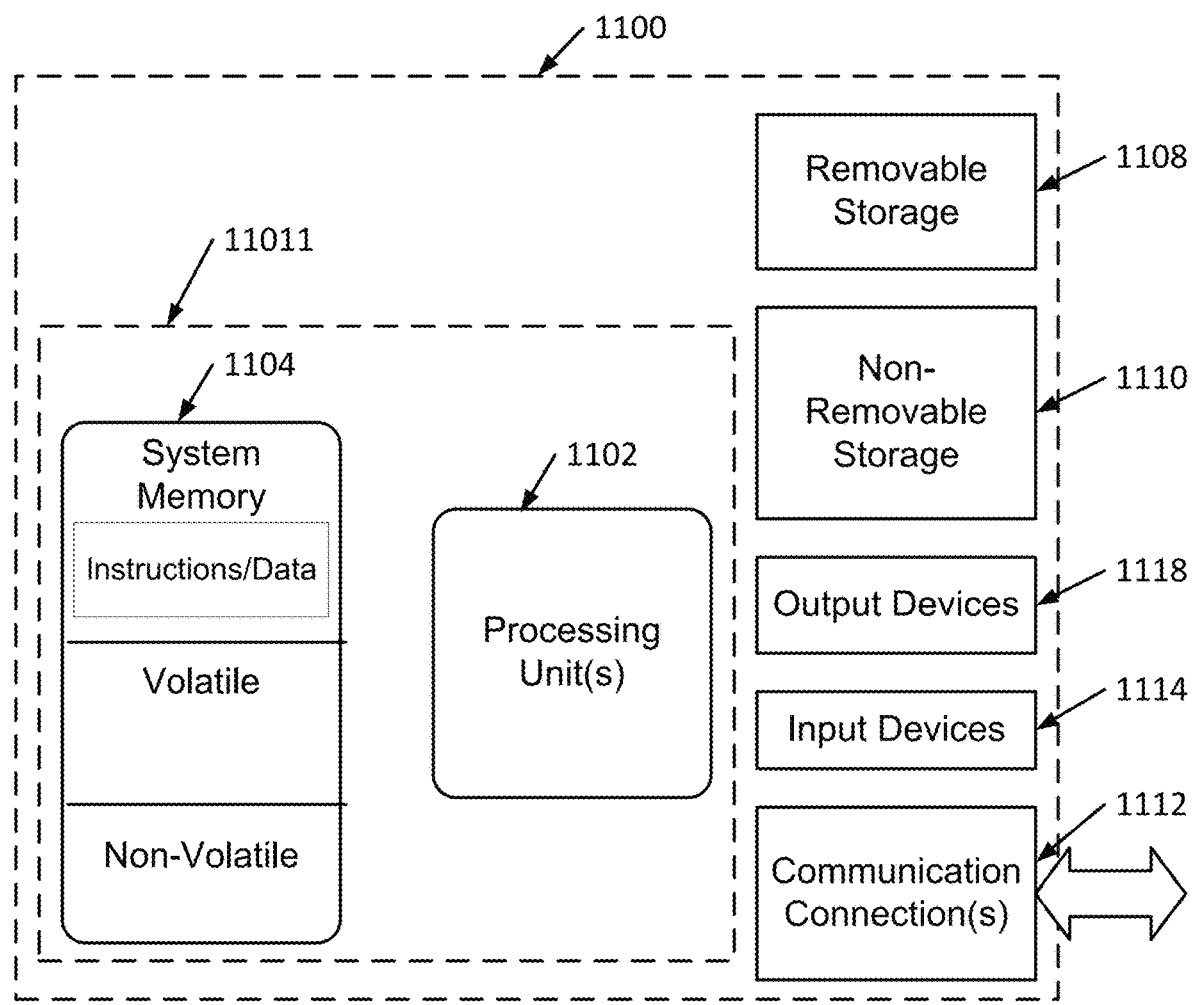
FIG. 11 illustrates one example of a suitable operating environment in which one or more of the present embodiments may be implemented.

FIG. 11 illustrates one example of a suitable operating environment 1100 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 1100 typically includes at least one processing unit 1102 and memory 1104. Depending on the exact configuration and type of computing device, memory 1104 (storing, among other things, source code, parallelizable structures, execution profile data, executable code segments, test vector data, unused/vulnerable code segments, behavioral events and/or instructions to perform the methods disclosed herein, etc.) may be volatile (such as RAM), non-volatile (such as ROM, flash memory, etc.), or some combination of the two. This most basic configuration is illustrated in FIG. 11 by dashed line 1106. Further, environment 1100 may also include storage devices (removable, 1108, and/or non-removable, 1110) including, but not limited to, magnetic or optical disks or tape. Similarly, environment 1100 may also have input device(s) 1114 such as keyboard, mouse, pen, voice input, etc. and/or output device(s) 1116 such as a display, speakers, printer, etc. Also included in the environment may be one or more communication connections, 1112, such as LAN, WAN, point to point, etc.

Operating environment 1100 typically includes at least some form of computer readable media. Computer readable media can be any available media that can be accessed by processing unit 1102 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 1100 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

We claim:

1. A system comprising:
   at least one processor; and
   memory coupled to the at least one processor, the memory comprising computer executable instructions that, when executed by the at least one processor, performs a method for reducing the attack surface of a code segment, the method comprising:
   receiving an executable first code segment at run time as part of a testing phase;
   associating, during execution of the first code segment, one or more shims with the first code segment, wherein the associating comprises:
     generating an abstraction of the executable first code segment based on observed structure and content of the first code segment; and
     associating the one or more shims with one or more points in the abstraction;
   executing, during the execution of the first code segment, the associated one or more shims to generate behavior events;
   analyzing, during the execution of the first code segment, the behavior events to determine one or more regions of the code segment to be modified;
   modifying, during the execution of the first code segment, the identified one or more regions from the code segment to reduce an attack surface of the first code segment;
   generating a model of expected behavior based on the code segment with the reduced attack surface;
   receiving a second code segment as part of a runtime phase;
   monitoring execution of the second code segment;
   detecting an anomalous behavior of the second code segment based on a difference between execution of the second code segment and the generated model of expected behavior; and
   performing at least one corrective action in response to the detected anomalous behavior.

2. The system of claim 1, wherein receiving the first code segment comprises evaluating the code segment to identify one or more locations to insert the one or more shims.

3. The system of claim 2, wherein evaluating the code segment comprises determining a coding language of the code segment, and determining one or more locations to associate the one or more shims based on the coding language.

4. The system of claim 1, wherein the one or more shims monitor and record control flow behavior of the first code segment to one or more storage locations.

5. The system of claim 1, wherein analyzing the behavior events comprises identifying code regions of the first code segment, wherein the code regions are at least one of unused, vulnerable, and unoptimized.

6. The system of claim 1, the method further comprising using the behavior events to generate at least one of: a textual report, and a graphical illustration of the evaluated code segment.

7. The system of claim 1, wherein modifying the identified one or more regions comprises generating a modified code segment, wherein the modified code segment is smaller in size than the received first code segment.

8. The system of claim 1, wherein modifying the identified one or more regions comprises disabling the one or more regions by at least one of: commenting out one or more portions of the code segment, removing links to one or more files, and modifying permission to one or more files.

9. A method for reducing the attack surface of a code segment, the method comprising:
   receiving a first code segment as part of a testing phase;
   associating, during execution of the first code segment, one or more shims into the first code segment, wherein the associating comprises:

generating an abstraction of the executable first code segment based on observed structure and content of the first code segment; and associating the one or more shims with one or more points in the abstraction; executing, during the execution of the first code segment, the associated one or more shims to generate behavior events;

analyzing, during the execution of the first code segment, the behavior events to determine one or more regions of the first code segment to be modified;

modifying the identified one or more regions from the first code segment to reduce an attack surface of the first code segment;

generating a model of expected behavior based on the code segment with the reduced attack surface;

receiving a second code segment as part of a runtime phase;

monitoring execution of the second code segment;

detecting an anomalous behavior of the second code segment based on a difference between execution of the second code segment and the generated model of expected behavior; and performing at least one corrective action in response to the detected anomalous behavior.

10. The method of claim 9, wherein the first code segment comprises compiled bytecode corresponding to at least one of: a document, a code library, an application, a service and a file.

11. The method of claim 9, wherein receiving the first code segment comprises executing the first code segment in a testing environment to determine the location of the one or more shims.

12. The method of claim 9, wherein the at least one corrective action includes at least one of repairing the second code segment, halting execution of the second code segment, and providing a notification of the anomalous behavior.

13. The method of claim 9, wherein analyzing the behavior events comprises identifying for the first code segment at least one of: a relationship, a dependency, and an execution path.

14. The method of claim 9, wherein modifying the identified one or more regions comprises at least one of: reducing a size of the first code segment, reducing memory and storage requirements of the first code segment, reducing of I/O operations of the first code segment, parallelizing operations of the first code segment, and disabling vulnerable code regions.

15. The method of claim 14, wherein modifying the identified one or more regions further comprises deploying the first code segment to an execution environment.

16. A non-transitory computer storage device encoding computer executable instructions that, when executed by at least one processor, perform a method for reducing the attack surface of a code segment, the method comprising:

receiving a first code segment as part of a testing phase;

associating, during execution of the first code segment, one or more shims into the first code segment, wherein the associating comprises:

generating an abstraction of the executable first code segment based on observed structure and content of the first code segment, and associating the one or more shims with one or more points in the abstraction;

executing, during the execution of the first code segment, the associated one or more shims to generate behavior events;

analyzing, during the execution of the code segment, the behavior events to determine one or more regions of the first code segment to be modified;

modifying, during the execution of the first code segment, the identified one or more regions from the first code segment to reduce an attack surface of the first code segment;

generating a model of expected behavior based on the code segment with the reduced attack surface;

receiving a second code segment as part of a runtime phase;

monitoring execution of the second code segment;

detecting an anomalous behavior of the second code segment based on a difference between execution of the second code segment and the generated model of expected behavior; and performing at least one corrective action in response to the detected anomalous behavior.

17. The computer storage device of claim 16, wherein modifying the identified one or more regions comprises generating a modified code segment, wherein the modified code segment is smaller in size than the received first code segment.

18. The computer storage device of claim 16, wherein the at least one corrective action includes at least one of repairing the second code segment, halting execution of the second code segment, and providing a notification of the anomalous behavior.

* * * * *